(12) United States Patent
Aharoni et al.

(10) Patent No.: US 11,882,206 B2
(45) Date of Patent: *Jan. 23, 2024

(54) EFFICIENT CONVOLUTION IN AN ENVIRONMENT THAT ENFORCES TILES

(71) Applicant: International Business Machines Corporation, Armonk, NY (US)

(72) Inventors: Ehud Aharoni, Kfar Saba (IL); Omri Soceanu, Haifa (IL); Allon Adir, Kiryat Tivon (IL); Hayim Shaul, Kfar Saba (IL); Gilad Ezov, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 17/402,569

(22) Filed: Aug. 15, 2021

(65) Prior Publication Data
US 2023/0053311 A1   Feb. 16, 2023

(51) Int. Cl.
*H04L 9/00* (2022.01)
*G06N 3/0464* (2023.01)
(Continued)

(52) U.S. Cl.
CPC ............... *H04L 9/008* (2013.01); *G06N 3/04* (2013.01)

(58) Field of Classification Search
CPC .................. H04L 9/008; G06N 3/04
See application file for complete search history.

(56) References Cited

U.S. PATENT DOCUMENTS 11,195,080 B1 * 12/2021 Nama ............... G06N 3/045
2018/0285715 A1 * 10/2018 Son ................. G06N 3/04
(Continued)

FOREIGN PATENT DOCUMENTS

CN    112699384 A    4/2021

OTHER PUBLICATIONS

CHET: Compiler and Runtime for Homomorphic Evaluation of Tensor Programs, by Chen et al., published Oct. 2018 (Year: 2018).*
(Continued)

*Primary Examiner* — Vu V Tran
(74) *Attorney, Agent, or Firm* — Dvir Gassner

(57) ABSTRACT

A method comprising: receiving an input tensor having a shape defined by $[n_1, \ldots, n_k]$, where k is equal to a number of dimensions that characterize the input tensor; receiving tile tensor metadata comprising: a tile tensor shape defined by $[t_1, \ldots, t_k]$, and information indicative of an interleaving stride to be applied with respect to each dimension of the tile tensor; constructing an output tensor comprising a plurality of the tile tensors, by applying a packing algorithm which maps each element of the input tensor to at least one slot location of one of the plurality of tile tensors, based on the tile tensor shape and the interleaving stride, wherein the interleaving stride results in non-contiguous mapping of the elements of the input tensor, such that each of the tile tensors includes a subset of the elements of the input tensor which are spaced within the input tensor according to the interleaving stride.

20 Claims, 20 Drawing Sheets

(51) Int. Cl.
  *G06N 3/063* (2023.01)
  *G06N 3/04* (2023.01)

(56) References Cited

U.S. PATENT DOCUMENTS

| | | | |
|---|---|---|---|
| 2020/0036510 A1 | 1/2020 | Gomez | |
| 2020/0076570 A1* | 3/2020 | Musuvathi | G06F 21/72 |
| 2020/0160226 A1* | 5/2020 | Ross | G06F 17/16 |
| 2020/0272892 A1* | 8/2020 | Desappan | G06T 1/60 |
| 2020/0301994 A1* | 9/2020 | Dikici | G06F 17/153 |
| 2021/0049463 A1 | 2/2021 | Ruff | |
| 2022/0029783 A1* | 1/2022 | Cheon | G06F 17/16 |
| 2022/0066760 A1* | 3/2022 | Chang | G06F 8/458 |

OTHER PUBLICATIONS

Ahmad Al Badawi et al., "Towards the AlexNet Moment for Homomorphic Encryption: HCNN, the First Homomorphic CNN on Encrypted Data with GPUs"; Online at: https://eprint.iacr.org/2018/1056.pdf. Aug. 19, 2020.
Alex Krizhevsky et al. "Imagenet classification with deep convolutional neural networks"; Neural Information Processing Systems, 25, 01; Dec. 3, 2012.
Alon Brutzkus, et al., "Low latency privacy preserving inference"; In Kamalika Chaudhuri and Ruslan Salakhutdinov, editors, Proceedings of the 36th International Conference on Machine Learning, vol. 97 of Proceedings of Machine Learning Research, pp. 812-821, Long Beach, California, USA, Jun. 9-15, 2019. PMLR.
Ayoub Benaissa, et al., "TenSEAL: A Library for Encrypted Tensor Operations Using Homomorphic Encryption"; ICLR 2021—Workshop on Distributed and Private Machine Learning (DPML). Apr. 30, 2021.
Chiraag Juvekar et al., "GAZELLE: A Low Latency Framework for Secure Neural Network Inference"; Online at: https://eprint.iacr.org/2018/073.pdf. Aug. 15-17, 2018.
Ehud Aharoni et al., "Tile Tensors: A versatile data structure with descriptive shapes for homomorphic encryption"; Online at: https://arxiv.org/pdf/2011.01805.pdf. Nov. 3, 2020.
Eric Crockett, "A low-depth homomorphic circuit for logistic regression model training"; Cryptology ePrint Archive, Report 2020/1483, Nov. 25, 2020.
Fabian Boemer, et al., "NGraph-HE2: A High-Throughput Framework for Neural Network Inference on Encrypted Data"; In Proceedings of the 7th ACM Workshop on Encrypted Computing & Applied Homomorphic Cryptography, WAHC'19, pp. 45-56, New York, NY, USA, 2019. Association for Computing Machinery.) Nov. 11, 2019.
J. Cheon, et al., "Homomorphic encryption for arithmetic of approximate numbers," in Proceedings of Advances in Cryptology—ASIACRYPT 2017. Springer Cham, Nov. 2017, pp. 409-437. Nov. 30, 2017.
Miran Kim, et al., "HEAR: human action recognition via neural networks on homomorphically encrypted data"; Online at: https://arxiv.org/pdf/2104.09164.pdf. Apr. 19, 2021.
Nayna Jain et al., "Efficient CNN Building Blocks for Encrypted Data"; Online at: https://arxiv.org/pdf/2102.00319.pdf. Jan. 30, 2021.
Qiao Zhang, et al., "Gala: Greedy computation for linear algebra in privacy-preserved neural networks"; Online at: https://arxiv.org/pdf/2105.01827.pdf, May 5, 2021.
Ran Gilad-Bachrach et al., "CryptoNets: Applying Neural Networks to Encrypted Data with High Throughput and Accuracy"; Proceedings of the 33 rd International Conference on Machine Learning, New York, NY, USA. JMLR: W&CP vol. 48. Online at: https://utstat.utoronto.ca/droy/icml16/publish/gilad-bachrach16.pdf. Jun. 20-22, 2016.
Roshan Dathathri et al., "CHET: An Optimizing Compiler for Fully-Homomorphic Neural-Network Inferencing"; Association for Computing Machinery; Online at: https://www.cs.utexas.edu/~roshan/CHET.pdf. Jun. 22-26, 2019.
Roshan Dathathri, et al., "Eva: An encrypted vector arithmetic language and compiler for efficient homomorphic computation"; Online at: https://arxiv.org/pdf/1912.11951.pdf. Jun. 26, 2020.
Shai Halevi et al., "Algorithms in helib"; In Juan A. Garay and Rosario Gennaro, editors, Advances in Cryptology—CRYPTO 2014—34th Annual Cryptology Conference, Santa Barbara, CA, USA, Aug. 17-21, 2014, Proceedings, Part I, vol. 8616 of Lecture Notes in Computer Science, pp. 554-571. Springer, Aug. 17, 2014.
Xiaoqian Jiang, et al., "Secure outsourced matrix computation and application to neural networks"; In Proceedings of the 2018 ACM SIGSAC Conference on Computer and Communications Security, CCS '18, p. 1209-1222, New York, NY, USA, 2018. Association for Computing Machinery. Oct. 15, 2018.
Xuechao Wei et al., "TGPA: tile-grained pipeline architecture for low latency CNN inference"; Online at: https://vast.cs.ucla.edu/sites/default/files/publications/PID5488167.pdf. Nov. 5-8, 2018.
Yu-Sheng Lin et al., "GrateTile: Efficient Sparse Tensor Tiling for CNN Processing"; Online at: https://arxiv.org/pdf/2009.08685.pdf. Sep. 18, 2020.

* cited by examiner

EFFICIENT CONVOLUTION IN AN ENVIRONMENT THAT ENFORCES TILES

BACKGROUND

The invention relates generally to the field of encryption/decryption schemes, algorithms, techniques, methods, computer programs, and systems.

Fully homomorphic encryption (FHE) provides malleable ciphertext, which allows operations to be performed on encrypted data, without first decrypting it. For example, if d denotes some data, E(d) denotes the encryption of d using a FHE scheme. Given E(d) and the scheme's public key, it is possible to compute E($f$(d)) for any function $f$, without knowing the decryption key, and without learning anything about d. The resulting computations are left in an encrypted form which, when decrypted, results in an identical output to that produced had the operations been performed on the unencrypted data.

One potential use for FHE is in the case of outsourcing storage and processing of sensitive data, while preserving privacy. For example, using an outsourced service to compute a classification prediction over medical data (e.g., medical images), while preserving the privacy of the patient. Using an FHE scheme allows a data owner to send their data in an encrypted form to a cloud service that hosts a trained classifier. The encryption ensures that the data remains confidential, since the cloud service will not have access to the private key needed to decrypt the data. The cloud service will be capable of applying the trained classifier to the encrypted data to make encrypted predictions, and return the predictions in encrypted form to the data owner.

However, running large neural networks using FHE only is still considered a computationally expensive task. This barrier forces users to search for other secure alternatives instead of enjoying the advantage of solutions that rely only on FHE.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive an input tensor, wherein the input tensor has a shape defined by $[n_1, \ldots, n_k]$, where k is equal to a number of dimensions that characterize the input tensor, receive tile tensor metadata comprising at least: (i) a tile tensor shape defined by $[t_1, \ldots, t_k]$, and (ii) information indicative of an interleaving stride to be applied with respect to each dimension of the tile tensor, and construct an output tensor comprising a plurality of the tile tensors, by applying a packing algorithm which maps each element of the input tensor to at least one slot location of one of the plurality of tile tensors, based, at least in part, on the tile tensor shape and the interleaving stride, wherein the interleaving stride results in non-contiguous mapping of the elements of the input tensor, such that each of the tile tensors includes a subset of the elements of the input tensor which are spaced within the input tensor according to the interleaving stride.

There is also provided, in an embodiment, a computer-implemented method comprising: receiving an input tensor, wherein the input tensor has a shape defined by $[n_1, \ldots, n_k]$, where k is equal to a number of dimensions that characterize the input tensor; receiving tile tensor metadata comprising at least: (i) a tile tensor shape defined by $[t_1, \ldots, t_k]$, and (ii) information indicative of an interleaving stride to be applied with respect to each dimension of the tile tensor; constructing an output tensor comprising a plurality of the tile tensors, by applying a packing algorithm which maps each element of the input tensor to at least one slot location of one of the plurality of tile tensors, based, at least in part, on the tile tensor shape and the interleaving stride, wherein the interleaving stride results in non-contiguous mapping of the elements of the input tensor, such that each of the tile tensors includes a subset of the elements of the input tensor which are spaced within the input tensor according to the interleaving stride.

There is further provided, in an embodiment, a computer program product comprising a non-transitory computer-readable storage medium having program instructions embodied therewith, the program instructions executable by at least one hardware processor to: receive an input tensor, wherein the input tensor has a shape defined by $[n_1, \ldots, n_k]$, where k is equal to a number of dimensions that characterize the input tensor; receive tile tensor metadata comprising at least: (i) a tile tensor shape defined by $[t_1, \ldots, t_k]$, and (ii) information indicative of an interleaving stride to be applied with respect to each dimension of the tile tensor; and construct an output tensor comprising a plurality of the tile tensors, by applying a packing algorithm which maps each element of the input tensor to at least one slot location of one of the plurality of tile tensors, based, at least in part, on the tile tensor shape and the interleaving stride, wherein the interleaving stride results in non-contiguous mapping of the elements of the input tensor, such that each of the tile tensors includes a subset of the elements of the input tensor which are spaced within the input tensor according to the interleaving stride.

In some embodiments, the program instructions are further executable to store, and the method further comprises storing the output tensor and the tile tensor metadata.

In some embodiments, the program instructions are further executable to unpack, and the method further comprises unpacking, the input tensor from the stored output tensor, based on the tile tensor metadata.

In some embodiments, the tile tensor metadata further comprises a replication parameter, and wherein the packing algorithm is configured to perform, based on the replication parameters, replication of the elements of the input tensor, such that each of the elements of the input tensor is mapped to multiple slot locations along a dimension of one of the tile tensors.

In some embodiments, the program instructions are further executable to, and the method further comprises: receive a filter associated with a convolution computation over the input tensor; compute the convolution by applying a multiplying operator which multiplies the filter element-wise over each of the tile tensors in the output tensor; apply a summation algorithm that sums over the results of the multiplying; and output a result of the applying of the summation algorithm as a result of the convolution.

In some embodiments, the convolution is part of a neural network inference.

In some embodiments, the tensor tiles are homomorphic encryption ciphertexts.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 3A-3C show tile tensor packing operations, according to some embodiments of the present disclosure;

FIGS. 5A-5C illustrate an interleaved tiling operation, according to some embodiments of the present disclosure;

DETAILED DESCRIPTION

Figure 1A:
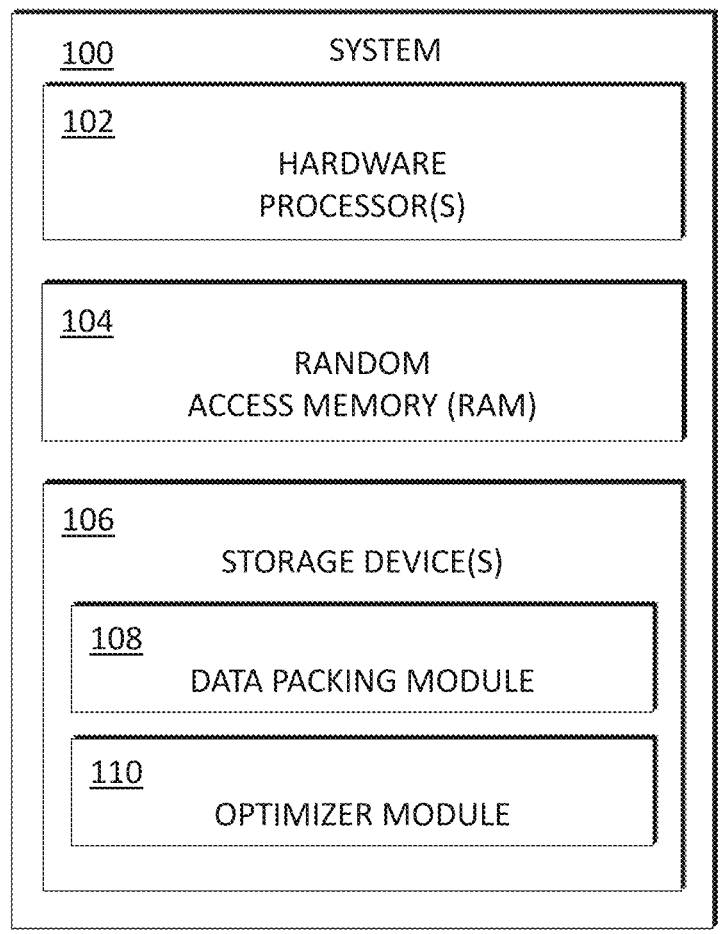
FIG. 1A is a block diagram of an exemplary system for data packing structure for fully homomorphic encryption (FHE) schemes, according to some embodiments of the present disclosure.

Disclosed herein is a technique, embodied in a method, system and a computer program product, for data packing in the context of fully homomorphic encryption (FHE) schemes, which permits efficient high-level tensor manipulation operations, such as convolution, over the encrypted data, while reducing computational overhead.

By way of background, an FHE scheme is an encryption scheme that allows to evaluate any circuit, and in particular any function, on encrypted data. The FHE scheme receives as input data a vector M[s] and returns (ENC) a ciphertext. The FHE also generates a secret encryption key/public encryption key pair associated with the encrypted input data. The created cyphertext has a number of slots s that is determined during the key generation. The cyphertext may be deciphered (DEC) using the generated private encryption key, to return an s-dimensional vector, wherein M=Dec(Enc(M)). The functions for addition (Add), multiplication (Mul) and rotation (Rot) are then defined as:

$Dec(Add(Enc(M),Enc(M')))=M+M'$ $Dec(Mul(Enc(M),Enc(M')))=M*M'$ $Dec(Rot(Enc(M),n))(i)=M((i+n) \bmod s)$ Some FHE schemes, such as CKKS (see J. Cheon, et al., "Homomorphic encryption for arithmetic of approximate numbers," in Proceedings of Advances in Cryptology—ASIACRYPT 2017. Springer Cham, 11 2017, pp. 409-437), operate on ciphertexts in a homomorphic SIMD fashion. This means that a single ciphertext encrypts a fixed size vector, and the homomorphic operations on the ciphertext are performed slot-wise on the elements of the plaintext vector. To utilize the SIMD feature, more than one input element must be packed and encrypted in each ciphertext. The packing method can dramatically affect the latency (i.e., time to perform computation), throughput (i.e., number of computations performed in a unit of time), communication costs, and memory requirements. However, deciding which packing to use is difficult and requires expert knowledge, and the more efficient packing may not be the trivial one. Moreover, different packing schemes offer different tradeoffs in terms of optimization goals. As the size of the FHE code increases, it becomes harder to find the optimal packing. For example, finding the best packing for a large neural network inference algorithm is a challenging task, because the input is typically a four- or five-dimensional tensor, and the computation involves a long sequence of operations such as matrix multiplication and convolution.

Accordingly, in some embodiments, the present disclosure provides for an FHE data packing technique which provides for high-level tensor manipulation operations, such as convolution.

In some embodiments, the present technique uses a data packing structure termed 'tile tensors.' A tile tensor allows users to store tensors of arbitrary shapes and sizes. The tile tensor automatically packs the tensor data into a collection of vectors of fixed size, as required in FHE environments, using a wide variety of configurable options. In some embodiments, tile tensors of the present disclosure also offer a set of operators to manipulate the tensor in its packed form. In some embodiments, tile tensors of the present disclosure supports the usage of operators on encrypted data, wherein the operators may be implemented using generic algorithms that can work with any packing arrangement, agnostically of the packing arrangement selected internally. Thus, the present disclosure provides for a packing-oblivious programming-framework that allows users to concentrate on the design of the algorithms to be inferenced on the data, rather than data packing decisions.

In some embodiments, the present disclosure further provides for a packing optimizer which operates in conjunction with the tile tensor data structure of the present disclosure. In some embodiments, the present optimizer searches for the optimum configuration for the tile tensor, given the user requirements and preferences. In some embodiments, the optimizer estimates the time and memory needed to run a given function for every option, and returns the configuration which optimizes a given objective, whether latency, throughput, or memory. In some embodiments, the present optimizer can be used to improve latency for small networks, adapt to various batch sizes, and scale up to much larger networks.

In some embodiments, the present disclosure provides a solution for convolution computations, which are a popular building block in the field of neural networks and machine learning models.

In some embodiments, the present disclosure is particularly useful in the context of image processing. For example, in some embodiments, the present disclosure supports convolution over unlimited image size (e.g., the total number of pixels) and reduces the number of rotations needed in the order of filterSize*sqrt (#imageSize−#slots). In some embodiments, the present disclosure can handle images with multiple channels, convolution of kernels or filters, and batch processing of multiple images, and has easily tuned parameters to optimize for specific scenarios.

In some embodiments, the present disclosure provides for a packing scheme which uses interleaved tiling, wherein input tensor values that are adjacent to each other are stored within the same slot of different tile. This way, when one wishes to calculate the convolution of a small filter over a large matrix, the calculations for the area covered by the filter are much simpler, because all values are in different tiles but are within the same slot.

In some embodiments, the present disclosure interprets a ciphertext as a matrix of size $T_x$ by $T_y$, referred to as a 'tile.' If the input tensor dimensions are $I_x$ by $I_y$, then a grid of $$Ex = \operatorname{ceil}\left(\frac{Ix}{Tx}\right) \text{ by } Ey = \operatorname{ceil}\left(\frac{Iy}{Ty}\right)$$

tiles are required to store the entire image. Input tensor values that are adjacent or in close proximity within the same region may be stored such that they map to the same slot of different tiles. Specifically, the image pixel at (i,j) may be mapped to tile at position (i % Ex, j % Ey), and to the slot at position $$\left(\operatorname{floor}\left(\frac{i}{Tx}\right), \operatorname{floor}\left(\frac{j}{Ty}\right)\right).$$

When calculating the convolution of a small filter over a large matrix, then all the calculations for the area covered by the filter are within the same slot. When calculations require crossing regions, i.e., mixing different slot positions, the tiles may be rotated so that again all of the values are aligned within the same slot position. The exact number of rotations can be calculated using the following method. Given an image size $I_x$, $I_y$, a filter having dimensions $F_x$, $F_y$, and a tile sizes $T_x$, $T_y$, the number of rotations will be $$(Fx-1) * \frac{Iy}{Ty} + (Fy-1) * \frac{Ix}{Tx} + (Fx-1)*(Fy-1).$$

Thus, the number of needed rotations is the square root of the size of the image, rather than of the same order as the size of the image. The present method, combined with tile tensor data structures, can be extended with additional dimensions, thus it also allows handling of multiple images (batch processing), multiple image channels, and multiple filters more efficiently. For example, sub-tile tensors may be used, where C is the number of channels, and B is the number of batches, wherein a sub-tile tensor contains the tensor [C,*, B], where * indicates a replicated dimension. The corresponding sub tile tensor shape would be $$\left[\frac{C}{t1}, \frac{*}{t2}, \frac{B}{t3}\right]$$

for some tile dimensions [t1, t2, t3], and the full tile tensor, including all pixels, would be $$\left[\frac{C}{t1}, \frac{*}{t2}, \frac{B}{t3}, \frac{Ix}{t4} \sim, \frac{Iy}{t5} \sim\right],$$

where the ~ indicate interleaved dimensions. A filter's pixel is a sub-tile tensor containing the tensor [C, F,*], with F denoting the size of the filter. Multiplying and summing over the C dimension results in a tensor [*, F, B]. The full tile tensor shape for all filter pixels is $$\left[Fx, Fy, \frac{C}{t1}, \frac{F}{t2}, \frac{*}{t3}, \frac{*}{t4}, \frac{*}{t5}\right].$$

Thus even if the image does fit inside the same ciphertext, but with all the channels and batches it does not fit inside a single ciphertext, the present disclosure is able to avoid duplications and reduce rotations.

Hardware and Software Environment

FIG. 1A is a block diagram of an exemplary system 100 for data packing structure for fully homomorphic encryption (FHE) schemes, according to some embodiments of the present disclosure.

System 100 may include one or more hardware processor(s) 102, a random-access memory (RAM) 104, and one or more non-transitory computer-readable storage device(s) 106. As shown in FIG. 1A, system 100 is an embodiment of a hardware and software environment for use with various embodiments of the present invention.

Storage device(s) 106 may have stored thereon program instructions and/or components configured to operate hardware processor(s) 102. The program instructions may include one or more software modules, such as a data packing module 108 and/or an optimizer module 110. The software components may include an operating system having various software components and/or drivers for controlling and managing general system tasks (e.g., memory management, storage device control, power management, etc.), and facilitating communication between various hardware and software components. System 100 may operate by loading instructions of data packing module 108 and/or optimizer module 110 into RAM 104 as they are being executed by processor(s) 102.

Figure 1B:
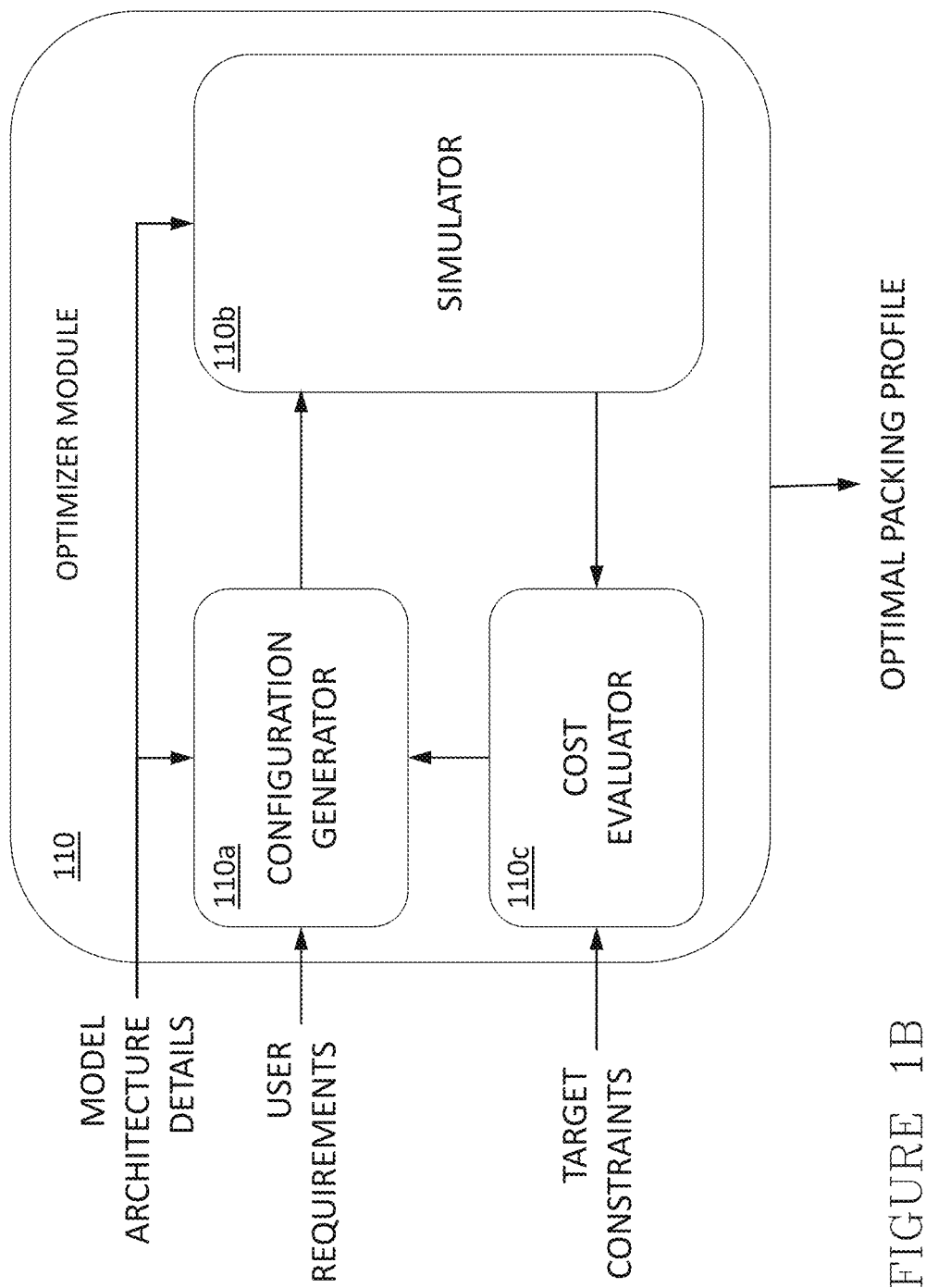
FIG. 1B presents a schematic of the packing optimizer, according to some embodiments of the present disclosure.

FIG. 1B is a block diagram of optimizer module 110. In some embodiments, optimizer module 110 is responsible for finding the most efficient packing arrangement for a given computation, as well as the optimal configuration of the underlying FHE library, e.g., in connection with the application of neural network operation to the FHE data.

In some embodiments, optimizer module 110 of the present disclosure receives as input the model architecture of a neural network to be applied. Optimizer module 110 automatically converts it to an FHE computation with optimal packing and optimal FHE library configuration. Users can further define packing constraints, such as the required security level or maximal memory usage, and choose an optimization target, whether to optimize for CPU time, latency or throughput, or optimize for memory usage.

In some embodiments, optimizer module 110 selects from among different possible configurations of the FHE library, as well as different packing techniques to support certain operators. In some embodiments, optimizer module 110 also selects the tile shape, i.e., the values of $t_1, t_2, \ldots,$ in the tile tensor shapes. For example, consider an FHE scheme configured to have 16,384 slots in each ciphertext. Assuming a desired convolution operator uses five-dimensional tiles, the number of possible tuples $t_1, \ldots, t_5$ such that $$\prod_i t_i = 16{,}384 \text{ is } \binom{\log_2(16{,}384) + 5 - 1}{5 - 1} = 3060.$$

In some embodiments, optimizer module 110 comprises three main units: the configuration generator 110a, the cost evaluator 110b, and the simulator 110c. in some embodiments, the optimization process may begin by a user providing a file (e.g., a JSON file) that contains the details of the model architecture to be applied in runtime. The configuration generator 110a generates a list of all possible configurations, including the packing details and FHE configuration details applicable for this architecture. The simulator unit 110b tests every such configuration and outputs one or more of the following data for each: the computation time of the different stages including encrypting the model and input samples, running inference, and decrypting the results; throughput; memory usage of the encrypted model; input; and output. Optimizer module 110 passes this data to the cost evaluator 110c for evaluation. Finally, optimizer module 110 returns the configuration option that yields the optimal cost to the user, together with the simulation output profile.

In some embodiments, the configuration generator unit 110a of optimizer module 110 receives the model architecture to be applied in runtime, and generates all applicable configurations for it. The generator unit 110a will then create multiple complete configurations by exploring all possible tile shapes. The generator unit 110a explores possible tile shape using one of two strategies. The first involves brute forcing over all valid options for tile shapes. Since these may be numerous, a second strategy searches using a "steepest ascent hill climbing" local search algorithm. The local search starts with a balanced tile shape, where the number of slots in every dimension is of the same order. This is a heuristic designed to avoid evaluating tile shapes that are likely to be computationally costly at the beginning of the search. Thus, all the neighbor tile shapes of the current shape can be iteratively evaluated, wherein the best-improving neighbor is selected, as long as one exists. In some embodiments, two tile shapes may be considered as neighbors, where one shape may be obtained from the other by multiplying or dividing the size of some of its dimensions by two. A tile shape may be deemed to be better over another tile shape based on the costs received from the cost evaluator. Using the local search algorithm highly speeds up the search process, and often results in a global optimum.

In some embodiments, the simulator unit 110b receives as inputs the model architecture to be applied in runtime, and a configuration option from configuration generator 110a. At this stage, the configuration may be evaluated by running it on encrypted input under FHE. To reduce computational costs, the simulator 110b may use pre-calculated benchmark values such as the CPU time of every HE operation and the memory consumption of a tile (i.e., the memory consumption of a single ciphertext). Then, simulator 110b evaluates the model to be applied on mockup tile tensor objects using these benchmarks. These mockup tile tensors contain only meta data and gather performance statistics. Using this approach, the simulator 110b can simulate an inference operation several order-of-magnitudes faster than when running the complete model on encrypted data.

In some embodiments, the cost evaluation unit 110c evaluates the simulator 110b output data considering the constraints and optimization targets, which may be user-provided. After testing all possible configurations, the highest scoring configuration(s) is sent back as output.

System 100, as described herein, is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As shown in FIG. 1A, system 100 is an environment in which an example method according to some embodiments of the present invention can be performed.

Figure 1C:
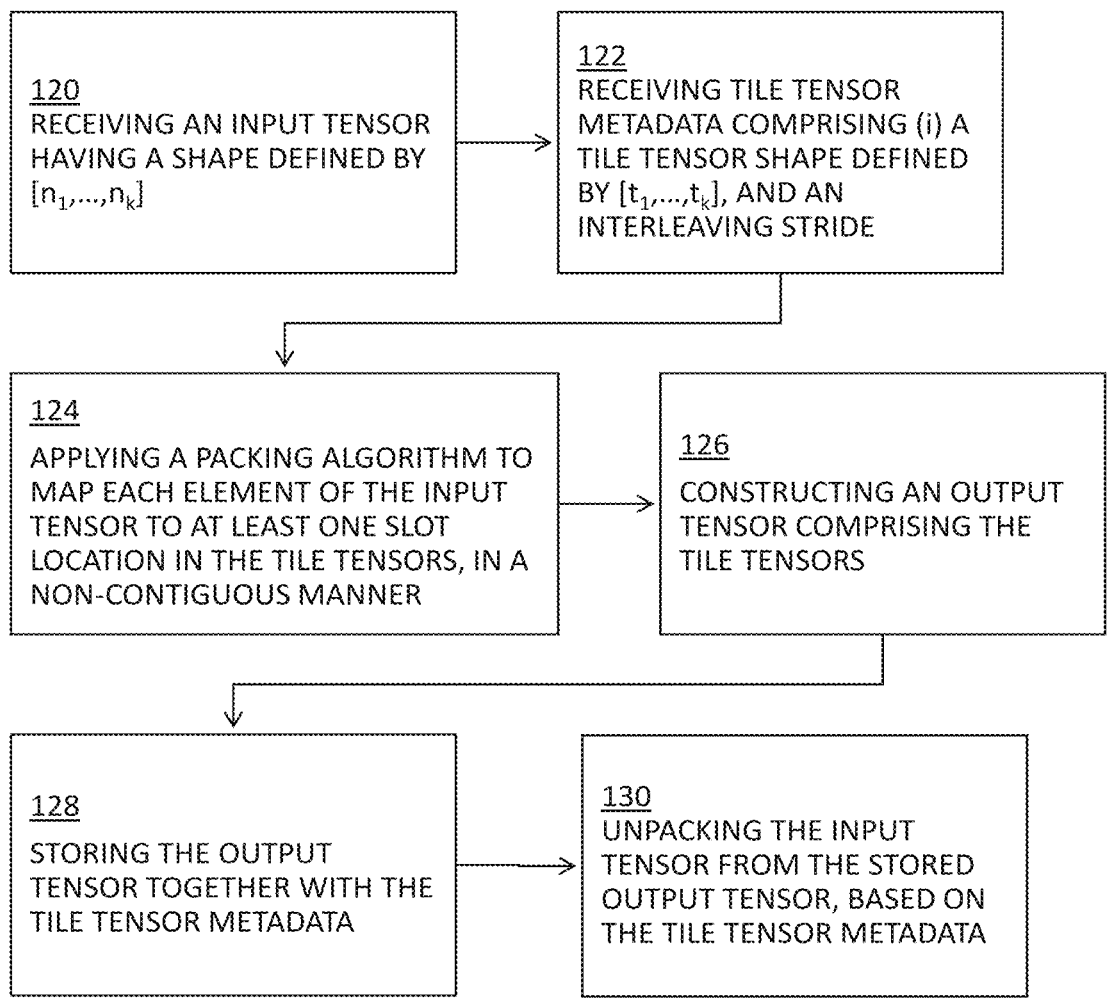
FIG. 1C is a flowchart of the functional steps in an example method according to some embodiments of the present invention.

FIG. 1C is a flowchart of the functional steps in an example method according to some embodiments of the present invention. The method of the flowchart is a method of an interleaved packing of a tile tensor from an input tensor. This method and associated software for packing the tile tensor will now be discussed, over the course of the following paragraphs, with reference to of FIGS. 1A-1C.

Processing begins at step 120, where system 100 receives the data of an input tensor A1 data set with k dimensions of sizes $n_1, n_2 \ldots n_k$. A tensor is a multi-dimension array, with k dimensions and shape $[n_1, n_2, \ldots n_k]$. For example, if the input tensor is a matrix with 4 rows and 5 columns, then k=2, $n_1=4$, $n_2=5$. If the input tensor is a vector of length 7, then k=1, $n_1=7$. If the input tensor is a 3D array of dimensions 10 by 20 by 30, then k=3, $n_1=10$, $n_2=20$, $n_3=30$.

In step 122, system 100 further receives tile tensor metadata, including a tile tensor shape and an interleaving stride. The tile tensor shape consists of the shape of the dimensions of the input tensor A1, namely k, $n_1, n_2, \ldots n_k$, and the packing details $t_1, t_2, \ldots, t_k$. The tile tensor data structure includes copy of the tile tensor shape as well.

The required number of tile tensors can be computed as follows. Let $$e_i = \text{ceil}\left(\frac{n_i}{t_i}\right),$$

where cell means rounding up to the nearest integer from above. The required number of tiles is $e_1 * e_2 * \ldots * e_k$.

In step 124, the instructions of system 100 cause packing module 108 to apply a packing algorithm, which maps each element of the input tensor to at least one slot location in the tile tensors, in a non-contiguous manner, based on the tile tensor shape and the interleaving stride. In some embodiments, the interleaving stride results in non-contiguous mapping of the elements of said input tensor, such that each of the tile tensors includes a subset of the elements of the input tensor which are spaced within the input tensor according to the interleaving stride.

In step 126, the instructions of system 100 cause packing module 108 to construct an output tensor comprising a plurality of the tile tensors.

In step 128, the instructions of system, 100 may cause it to store, e.g., in storage device 106, the output tensor and the tile tensor metadata.

In step 130, the instructions of system, 100 may cause it to unpack the input tensor from the stored output tensor, based on the tile tensor metadata.

Tensor Basic Operations

As used herein, the term 'tensor' is synonymous with multi-dimensional array, as this is common in the AI domain.

A k-dimensional tensor may be denoted by $[n_1, n_2, \ldots, n_k]$, where $0 \leq n_i$ is the size of the i'th dimension. For example, the shape of a 5×6 matrix M is [5,6]. For a tensor $R[n_1, \ldots, n_k]$, $R(j_1, j_2, \ldots, j_k)$ may be used to refer to a specific element, where $0 \leq j_i < n_i$.

Matrix multiplication operation shall be denoted herein without a multiplication symbol, e.g., $M_1 M_2$ stands for the product of $M_1$ and $M_2$. The transpose operation of a matrix M may be denoted by $M^T$, and tags (e.g., M',M'') may be used to denote different objects. The operations $M_1 + M_2$ and $M_1 * M_2$ refer to element-wise addition and multiplication, respectively.

The tensors $A[n_1, \ldots, n_k]$ and $B[m_1, \ldots, m_k]$ are said to have compatible shapes if $m_i = n_i$ or either $n_i = 1$ or $m_i = 1$, for $i \leq k$. Their mutual expanded shape is $[\max\{n_i, m_i\}]_{i \leq k}$.

When a tensor A has more dimensions than a tensor B, their dimensions can be matched by expanding B with dimensions of size 1. This results in equivalent tensors up to transposition. For example, both tensors V[b] and V[b, 1] represent column vectors, while $V[1, b] = V^T$ represents a row vector.

The broadcasting operation takes two tensors with compatible but different shapes and expands every one of them to their mutual expanded shape. For a tensor $A[n_1, \ldots, n_k]$ and a tensor shape $s = [m_1, \ldots, m_k]$ with $n_i \in \{1, m_i\}$ for each $i = 1, \ldots, k$, the operation $C = \text{broadcast}(A, s)$ replicates the content of A along the r dimension $m_r$ times for every $r = 1, \ldots, k$ and $n_r = 1 < m_r$. The output tensor C is of shape s.

The tensors A[3,4,1] and B[1,4,5] have compatible shapes. Their mutual expanded shape is $s = [3,4,5]$ and broadcast(A, s) has the same shape s as broadcast(B, s).

Element-wise operations, such as addition (A+B) and multiplication (A*B) on two tensors with compatible shapes A, B, may be performed by first using broadcasting to expand them to their mutual expanded shape and then performing the relevant element-wise operation. Thus, for a tensor $A[n_1, \ldots, n_k]$, the operation $B = \text{sum}(A, t)$ sums the elements of A along the t-th dimension and the resulting tensor B has shape $[n_1, \ldots, n_{t-1}, 1, \ldots, n_k]$ and $$B(j_1, \ldots, j_{t-1}, 0, \ldots, j_k) = \sum_{l=0}^{n_t - 1} A(j_1, \ldots, j_{t-1}, l, \ldots, j_k),$$

for all $j_i < n_i$ for $i \in \{1, 2, \ldots, k\} \setminus \{t\}$,

Using broadcasting and summation, common algebraic operators can be performed. For two matrices $M_1$ [a, b], $M_2$ [b, c] and the column vector V[b, 1], matrix-vector multiplication may be performed using $M_1 V = \text{sum}(M_1 * V^T, 2)$, where $M_1$ and $V^T$ have compatible shapes with the mutual expanded shape of [a, b]. Matrix-matrix multiplication may be performed using $M_1 M_2 = \text{sum}(M_1, *M_{2'}, 2)$, where $M_{1'} = M_1[a, b, 1]$ and $M_{2'} = M_2[1, b, c]$.

Tile Tensors

In some embodiments, a 'tile tensor' is a data structure containing an external tensor as data and a tile tensor shape as meta data. An 'external tensor' is a tensor in which each element is a tile.

In some embodiments, a tile tensor of the present disclosure is a data structure that packs tensors in fixed size chunks, as required for FHE, and allows them to be manipulated similarly to regular, i.e., non-encrypted, tensors. In other words, performing operations on the tile tensors of the present disclosure may be considered to be equivalent (or "homomorphic," as is the mathematical term) to directly operating on the input tensors.

As the term is used herein, a "tensor" is any multi-dimensional array of numbers. One special case for tensors is when the array is one dimensional, in which case the array is generally referred to as a vector. In the case of a two-dimensional vector, it is commonly referred to as a matrix. It is understood in the art that the numbers making up a tensor can be integers or floating-point numbers or complex numbers. However, in some tensors, the elements of a vector may not take the form of numbers, but, rather, these elements may take other forms, such as characters, strings, or other objects. In the specific examples discussed in this document, it will generally be assumed that the tensors contain elements in the form of numbers unless otherwise noted.

It is known that tensors can be packed into tiles and, further, that mathematical operators can be performed on these tensors while in packed form. As used herein, a "tile" is any contiguous block of data storage in a data storage device (for example, a volatile memory type data storage device) of fixed size, capable of holding n numbers, where n is some fixed size determined by system configuration. In this way, all tiles will have the same size of n numbers.

It is understood by those of skill in the art that mathematical operations can be performed on the elements of tiles (for example, the numbers making up a tile). Such a mathematical operation is typically performed element-wise on the respective numbers of the respective tile(s) being subject to the mathematical operation. For example, if tile $T_1$ has the numbers $(x_1, x_2, \ldots x_n)$ and tile $T_2$ has the numbers $(y_1, y_2, \ldots y_n)$, then $T_1 + T_2$ is a tile containing $(x_1 + y_1, x_2 + y_2, \ldots x_n + y_n)$. And similarly, $T_1 * T_2$ is a tile containing $(x_1 * y_1, x_2 * y_2, \ldots, x_n * y_n)$. Tiles can also be rotated by an any offset r, which means moving each element r slots to the left (or to the right, if r is negative), and first elements rotate back to being last. For example, if $T_1 = (1,2,3,4,5,6,7,8)$ then T_1 rotated by 2 is (3,4,5,6,7,8,1,2) and rotate by −2 is (7,8,1,2,3,4,5,6).

The process of creating a tile tensor from an input tensor is termed packing. The inputs to this process are the tensor itself and a tile tensor shape, e.g., meta-data indicating the packing scheme. The output is a tile tensor data structure containing a set of tiles filled with data copied from the tensor and arranged within the tiles according to the tile tensor shape. The tile tensor data structure includes a copy of the tile tensor shape as well. The tensor can be retrieved back from the tile tensor using a process called "unpacking." The tile tensor shape is used to identify how the tensor's elements are arranged within the tiles, and copied back into a tensor. Given one or more tile tensors, operators can be applied to them. These operators may change both the content of the tiles, and the tile tensor shapes of the tile tensors.

In some embodiments, an 'external tensor' as used herein is a k-dimensional tensor wherein each of its elements is itself a k-dimensional tensor, all having an identical shape. These internal tensors are referred to as 'tiles' or 'tile tensors,' their shape is the 'tile shape,' and the shape of the external tensor is the 'external shape.' A slot in E is identified by $E(a_1, \ldots, a_k)(b_1, \ldots, b_k)$ where $a_i$ are the external indices of a tile, and $b_i$ are the internal indices inside the tile.

A k-dimensional 'tile tensor shape' is comprised of an external shape $[e_1, \ldots, e_k]$, tile shape $[t_1, \ldots t_k]$, original shape $[n_1, \ldots, n_k]$, replication counts $[r_1, \ldots r_k]$, interleaved Boolean indicator $[l_1, \ldots, l_k]$, and unknown Boolean indicators $[u_1, \ldots, u_k]$. It is required that $\forall_i (r_i=1 \lor n_i=1) \land (\max(r_i, n_i) \leq e_i t_i)$.

Given a tile tensor shape S, an external tensor E, a specific slot in E specified by external indices $(a_1, a_k)$, and internal indices $(b_1, \ldots b_k)$, then this slot is associated with the logical indices $(c_1, \ldots, c_k)$ with respect to S, computed as follows: For $i=1, \ldots, k$, if the interleaved indicator $l_i$ is true, then $c_i = b_i e_i + a_i$ else $c_i = a_i t_i + b_i$.

A tile tensor shape S is valid for an external tensor E if their external shapes and tile shapes match, and there exists a tensor $T[n_1, \ldots, n_k]$ such that for $T_1 = \text{broadcast}(T, [n_1 n_2, \ldots, n_2 r_2])$ it holds that $E(a_1, \ldots, a_k)(b_1, \ldots, b_k) = T_1(c_1, \ldots, c_k)$ for all slots with internal, external, and logical indices $a_i$, $b_i$, $c_i$, such that $\forall_i c_i \leq n_i r_i$. For all other slots of E, if $\forall_i ((c_i \geq r_i n_i) \to \neg u_i)$ then these slots are set to zero. T is the packed tensor.

Tile tensor is a pair (E, S) where E is an external tensor and S a tile tensor shape that is valid for it.

Given a tile tensor $T_A = (E, S)$ the operator unpack(E) results with the packed tensor of $T_A$.

Given a tensor A and a tile tensor shape S whose original shape matches the shape of A, then the pack operator pack(A, S) results with a tile tensor $T_A = (E, S)$ such that A is the packed tensor of $T_A$.

A tile tensor shape can be specified with a special notation involving a list of symbols. Each element in the list specifies the details of one dimension.

$$\frac{n_i}{t_i}$$

specifies the original and tile shape along this dimension, and $r_i = 1$, $$e_i = \frac{n_i}{t_i},$$

$l_i = u_i = \text{false}$.

$$\frac{*r_i}{t_i}$$

further specifies the replication count and $n_i = 1$, and $$\frac{*}{t_i}$$

specifies $n_i = 1$, $r_i = t_i$.

$$\frac{n_i \sim}{t_i}$$

specifies $l_i = \text{true}$, and $$\frac{n_i \sim e_i}{t_i}$$

specifies a value for $e_i$ other than the default mentioned above. For any of the above mentioned options a "?" symbol above the line indicates $u_i = \text{true}$.

Tile Tensor Data Structure

In some embodiments, a basic tiling process according to some embodiments of the present disclosure may comprise taking a tensor $A[n_1, n_2, \ldots, n_k]$, and breaking it down into equal-size blocks, or tiles, each having the shape $[t_1, t_2, \ldots, t_k]$.

Figure 3A:
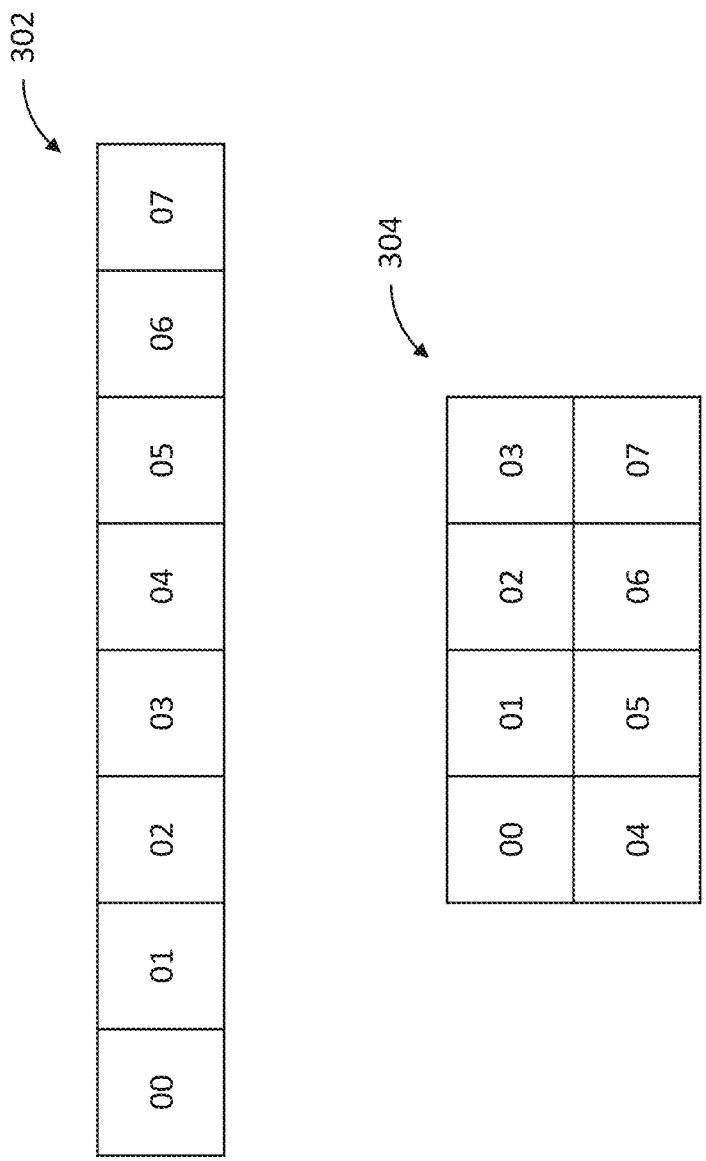
Figure 3B:
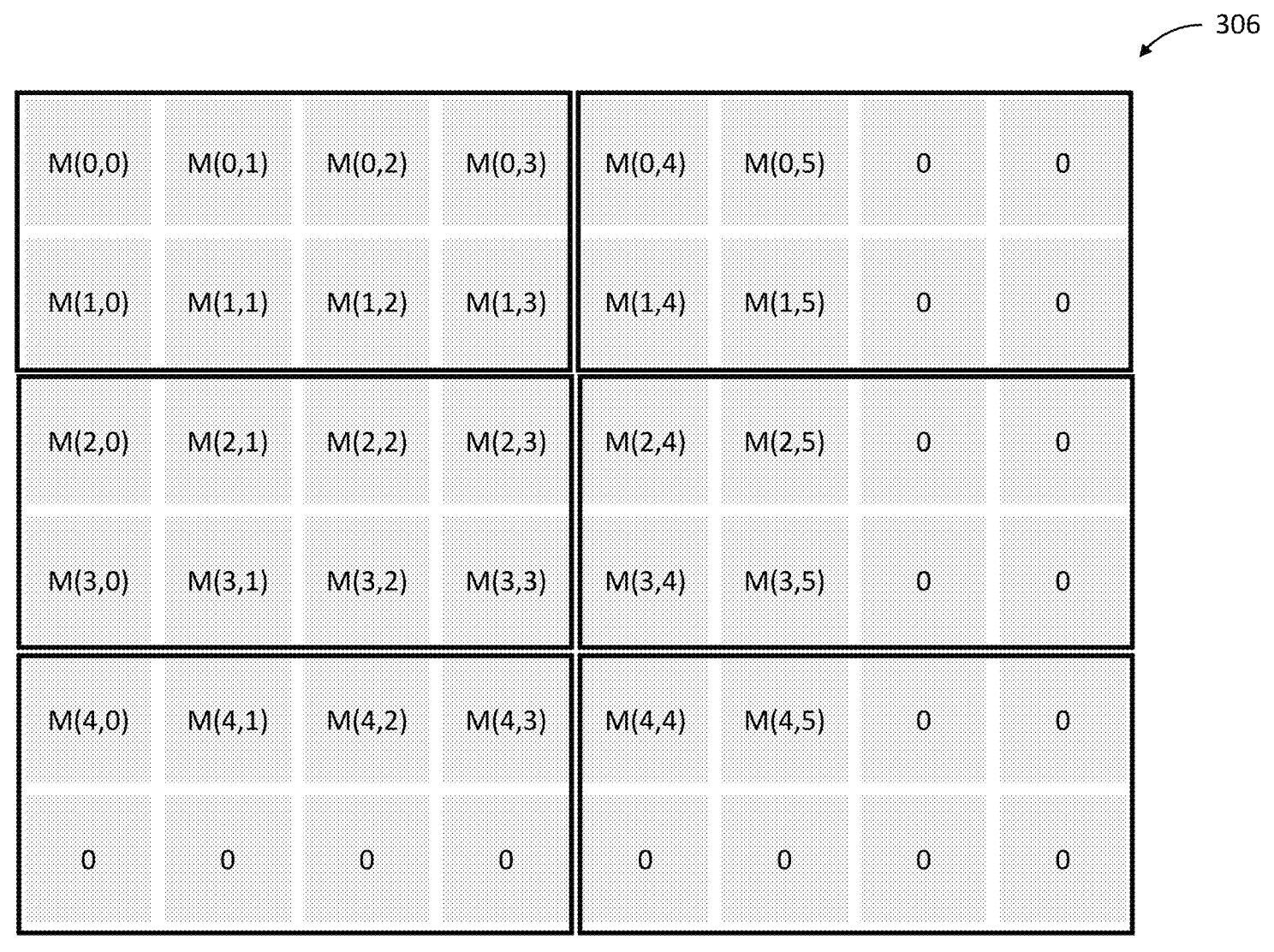
Figure 3C:
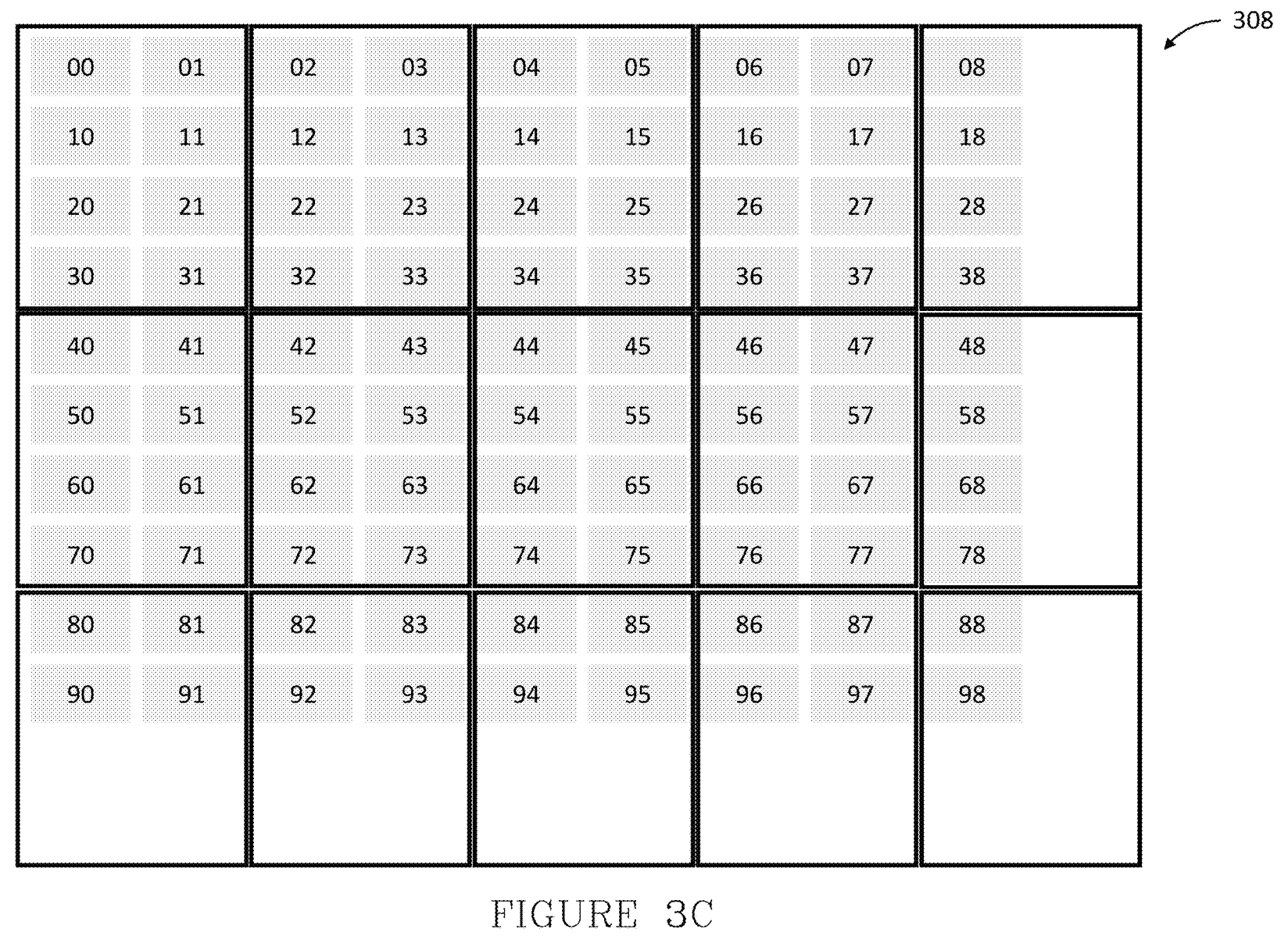

FIG. 3A shows a tile tensor packing operation. Input tensor 302, e.g., a one-dimensional vector comprising 8 values 00-07, may be reinterpreted as a multi-dimensional array 304, e.g., [2,4].

In some embodiments, a tensor $E[e_1, e_2, \ldots, e_k]$ may then be constructed, which may be termed an 'external tensor,' such that each element of E is a tile, and $$e_i = \frac{n_i}{t_i}.$$

Thus, $T = E(a_1, a_2, \ldots, a_k)$ for $0 \leq a_i < e_i$, is a specific tile in E, and $T(b_1, b_2, \ldots, b_k)$ for $0 \leq b_i < t_i$ is a specific slot inside this tile. An element of the original tensor $A(c_1, c_2, \ldots, c_k)$ will be mapped to tile indices $$a_i = \frac{c_i}{t_i},$$

and indices inside the tile $b_i = c_i \mod t_i$. All other slots in E that were not mapped to any element of A will be set to 0. FIG. 3B demonstrates three examples for tiling a matrix M[5,6] using 8-slot tile tensors of shape [2,4]. As can be seen, the resulting shape of the external tensor is [3,2], and the tile shape is [2,4]. FIG. 3C shows tiling a matrix M[9,10] using tiles of shape [2,4].

Tile tensor shapes may be denoted using the following notation. For example, $$\left[\frac{n_1}{t_1}, \frac{n_2}{t_2}, \ldots, \frac{n_k}{t_k}\right]$$

is a tile tensor shape specifying an input tensor of shape $[n_1, \ldots, n_k]$, packed and tiled using tiles of shape $[t_1, \ldots, t_k]$. In this notation, if $t_i = 1$, then it can be omitted. For example, $$\left[\frac{5}{1},\frac{6}{8}\right]$$

can be written $$\left[5,\frac{6}{8}\right].$$

A tile tensor can be created using a pack operation that receives a tensor $A[n_1, \ldots, n_k]$ to be packed and the desired tile tensor shape:

$$T_A = \text{pack}\left(A, \left[\frac{n_1}{t_1}, \ldots, \frac{n_k}{t_k}\right]\right).$$

The pack operator computes the external tensor using the tiling process described above, and stores along-side it the tile tensor shape, to form the full tile tensor $T_A$. A may be retrieved back using the unpack operation: $A=\text{unpack}(T_A)$. As with regular tensors, a tile tensor $T_A$ may be denoted together with its shape:

$$T_A\left[\frac{n_1}{t_1}, \ldots, \frac{n_k}{t_k}\right].$$

In some embodiments, tile tensors can be manipulated by operators by changing the content of the multi-dimensional array of tiles and the accompanying packing details and other meta data. The change is made in such a way that the operator is equivalent to applying such an operator directly tensors they contain packed inside. For example, if tensor $A_1$ is packed inside tile tensor $TA_1$, and tensor $A_2$ is packed inside tile tensor $TA_1$, then software instructions can apply the "add" operator on $TA_1$ and $TA_2$, obtaining a new tile tensor $TA_3$. Unpacking $TA_3$ will result in a tensor A3, which is equal to $A_1+A_2$.

Replication

For some computations it is useful to have the tensor data replicated several times inside the tile slots. The tile tensor shape indicates this by using the $$\frac{*}{t_i}$$

notation. It implies that $n_i=1$, but each element of the original tensor is replicated $t_i$ times along the i'th dimension. When packing a tensor $A[n_1, \ldots, n_k]$ and $n_i=1$, and with a tile tensor shape specifying $$\frac{*}{t_i},$$

then the packing operation performs broadcast(A, $[n_1, \ldots, t_i, \ldots, n_k]$) and tiles the result. The unpacking process shrinks the tensor back to its original size. The replications can either be ignored, or an average of them can be taken; this is useful if the data is stored in a noisy storage medium, as in approximate FHE schemes.

Unknown Values

When tensors are packed into tile tensors, unused slots are filled with zeroes, as shown, e.g., in FIG. 3B. When operators are applied on tile tensors, unused slots might get filled with arbitrary values. Although these unused slots are ignored when the tile tensor is unpacked, the presence of arbitrary values in them can still impact the validity or performance of applying additional operators. To reflect this state, the tile tensor shape contains an additional flag per dimension, denoted by the symbol "?", indicating the presence of unknown values.

Figure 3D:
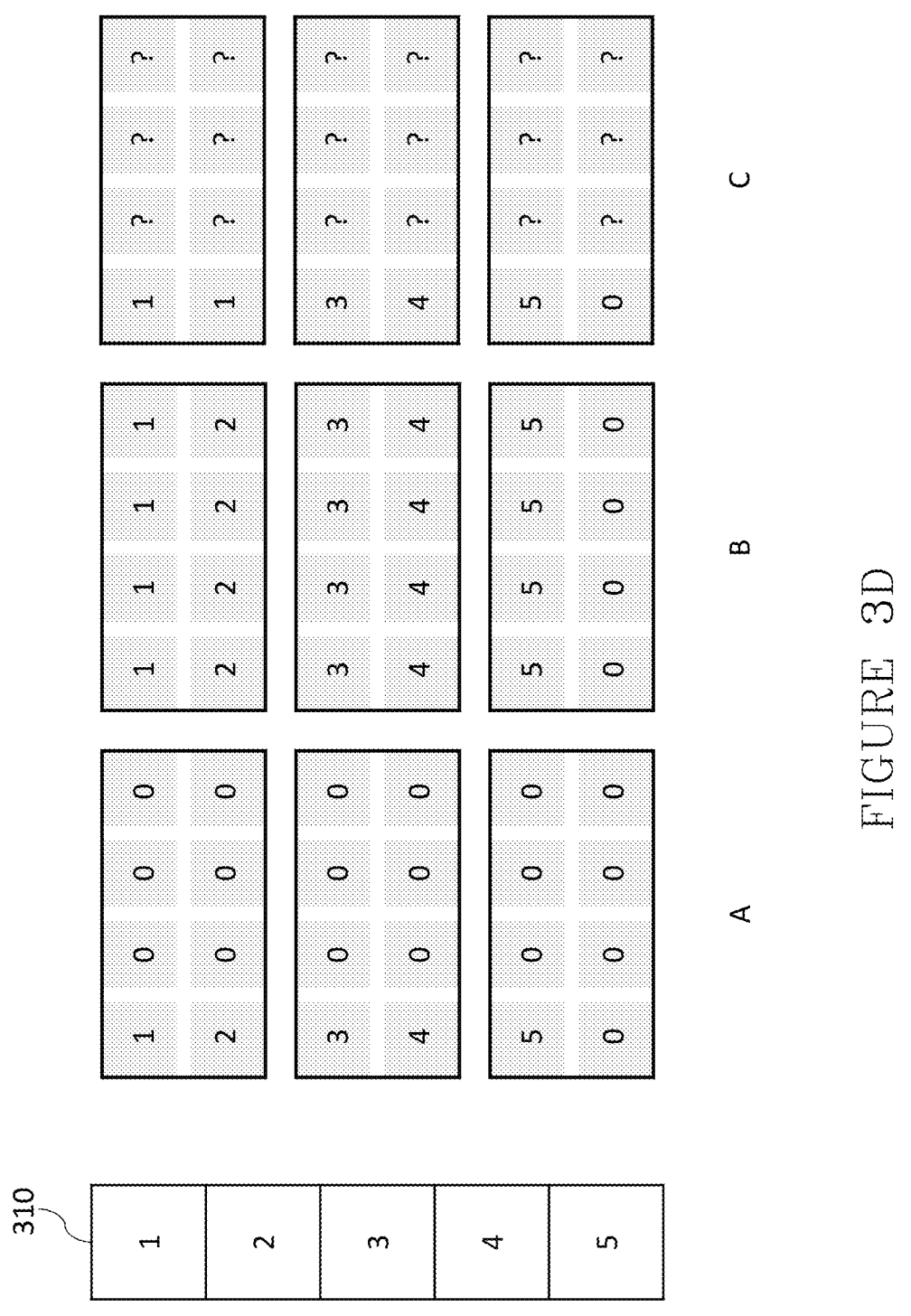

FIG. 3D shows packing tensor V[5, 1] into tile tensors using different tile tensor shapes:

Panel A uses a tile tensor with the shape $$T_{V[\frac{5}{2},\frac{1}{4}]}.$$

Panel B demonstrates tiling with replication, where the packing process computes V'=broadcast(V, [5,4]) and uses tiles of shape $$T'_{V[\frac{5}{2},\frac{*}{4}]}.$$

Panel C uses a tile tensor with the shape $$T''_{V[\frac{5}{2},\frac{1?}{4}]}.$$

The "?" in the second dimension indicates that whenever the valid range of the packed tensor is exceeded along this dimension, there may be encountered arbitrary unknown values. However, it still holds that $V=\text{unpack}(T_V)$, as these unused slots are ignored.

Operators

Tile tensor operators are homomorphic operations between tile tensors and the packed tensors they contain. For two tile tensors $T_A$ and $T_B$, and a binary operator $\odot$, it holds that $\text{unpack}(T_A \odot T_B)=\text{unpack}(T_A)\odot\text{unpack}(T_B)$. Unary operators are similarly defined.

Binary elementwise operators are implemented by applying the operator on the external tensors tile-wise, and the tile tensor shape is updated to reflect the shape of the result. If the inputs have identical shape, then so do the results, e.g., $$T_{M''}\left[\frac{5}{2}, \frac{6}{4}\right]$$

in FIG. 3C can be multiplied with an identically packed matrix $$T_N\left[\frac{5}{2}, \frac{6}{4}\right],$$

resulting in $$T_R\left[\frac{5}{2}, \frac{6}{4}\right],$$

where R=M*N. As with regular tensors, the tile tensor shapes need not be identical, but compatible. Compatible tile tensor shapes have the same number of dimensions, and for each dimension specification they are either identical, or one is $$\frac{*}{t_i}$$

and the other is $$\frac{n_i}{t_i}.$$

The intuition is that if the tensor is already broadcast inside the tile, it can be further broadcast to match any size by replicating the tile itself. For example, for $$T_{V'}\left[\frac{5}{2}, \frac{*}{4}\right]$$

panel B, $TM_{..}*T_{V'}$ may be computed, resulting in $$T_{R'} = \left[\frac{5}{2}, \frac{6}{4}\right].$$

$T_{M''}+T_{V'}$, may also be computed, but this results in $$T_{R''}\left[\frac{5}{2}, \frac{6?}{4}\right].$$

i.e., with unknown values in unused slots along the second dimension. This occurs because in $T_V$, this dimension is filled with replicated values, and after the addition they fill the unused slots of the result. Computing $T_{M''}*T_V$ is illegal because their shapes are not compatible.

The sum operator is also defined homomorphically: unpack(sum($T_A$, i))=sum(unpack($T_A$), i). It works by summing over the external tensor along the i'th dimension, then by summing inside each tile along the i'th dimension. In an FHE environment, the latter summation requires using the rotate-and-sum algorithm. Generally, the sum operator reduces the i'th dimension and the resulting tile tensor shape changes to $$\frac{1?}{t_i}.$$

However, mere are some useful special cases. If $t_i=1$, then it is reduced to 1/1 or simply 1. When i is the smallest i such that $t_i>1$, the dimension reduces to $$\frac{*}{t_i},$$

i.e., the sum results are replicated. This is due to properties of the rotate-and-sum algorithms. It is a useful property, since this replication is sometimes needed for compatibility with another tile tensor. For example, let $T_A$ be a tile tensor with the shape $$\left[4, \frac{3}{8}, \frac{5}{16}\right].$$

Then sum($T_A$, 1) is of shape $$\left[1, \frac{3}{8}, \frac{5}{16}\right];$$

sum($T_A$, 2) is of shape $$\left[4, \frac{*}{8}, \frac{5}{16}\right]$$

and sum($T_A$, 3) is of shape $$\left[4, \frac{3}{8}, \frac{1?}{16}\right].$$

Three other operators do not change the packed tensor, just the external tensor and tile tensor shape. The clear($T_A$) operator clears unknown values by multiplying with a mask containing ones for all used slots, i.e., it removes the "?" from the tile tensor shape. For example, $$\text{clear}\left(T_{V''}\left[\frac{5}{2}, \frac{1?}{4}\right]\right) = T_V\left[\frac{5}{2}, \frac{1?}{4}\right].$$

The rep($T_A$, i) operator assumes the i'th dimension is $$\frac{1}{t_i},$$

and replicates it to $$\frac{*}{t_i},$$

using a rotate-and-sum algorithm. The flatten($T_A$, i, j) operator flattens dimensions i through j assuming they are all replicated. This is done trivially by just changing the meta data, e.g., $$\text{flatten}\left(T_A\left[\frac{3}{4}, \frac{*}{8}, \frac{*}{2}, \frac{5}{32}\right], 2, 3\right)$$

results with $$T_{A'}\left[\frac{3}{4}, \frac{*}{16}, \frac{5}{32}\right]$$

Higher Level Operators

Using elementwise operators and summation, various algebraic operations may be performed on tile tensors.

In some embodiments, given a matrix M[a, b] and a vector V[b], V may be reshaped into V[1, b] for compatibility, and pack both tensors into tile tensors as $$T_M\left[\frac{a}{t_1}, \frac{b}{t_2}\right],$$

and $$T_V\left[\frac{*}{t_1}, \frac{b}{t_2}\right],$$

for some chosen tile shape [$t_1$, $t_2$]. These may be then multiplied using:

$$T_R\left[\frac{a}{t_1}, \frac{1?}{t_2}\right] = \text{sum}\left(T\left[\frac{a}{t_1}, \frac{b}{t_2}\right] * T_V\left[\frac{*}{t_1}, \frac{b}{t_2}\right], 2\right). \quad (1)$$

Eq(1) works for any value of a, b, $t_1$, $t_2$. This is because the tile tensor shapes of $T_M$ and $T_V$ are compatible, and therefore, due to the homomorphism, this computes R[a, 1]=sum(M[a, b]*V[1, b], 2), which produces the correct result as explained above.

A second option is to initially transpose both M and V and pack them in tile tensors $$T_M\left[\frac{b}{t_1}, \frac{a}{t_2}\right]$$

and $$T_V\left[\frac{b}{t_1}, \frac{*}{t_2}\right].$$

Now they may be multiplied as:

$$T_R\left[\frac{*}{t_1}, \frac{a}{t_2}\right] = \text{sum}\left(T_M\left[\frac{b}{t_1}, \frac{a}{t_2}\right] * T_V\left[\frac{b}{t_1}, \frac{*}{t_2}\right], 1\right). \quad (2)$$

This computes the correct result using the same reasoning as before. The benefit here is that the result $$T_R\left[\frac{*}{t_1}, \frac{a}{t_2}\right]$$

is replicated along the first dimension due to the properties of the sum operator. Thus, it is ready to play the role of $T_V$ in Eq(1) above, and two matrix-vector multiplications consecutively may be performed without any processing in between. The output of Eq(1) above can be processed to fit as input for Eq(5) below, using rep(clean($T_R$),2).

The above reasoning easily extends to matrix-matrix multiplication as follows. Given matrices $M_1$[a, b] and $M_2$[b, c], their product may be computed using either of the next two equation, where in the second one $M_1$ is transposed prior to packing. As before, the result of the second fits as input to the first.

$$T_R\left[\frac{a}{t_1}, \frac{1?}{t_2}, \frac{c}{t_3}\right] = \text{sum}\left(T_{M_1}\left[\frac{a}{t_1}, \frac{b}{t_2}, \frac{*}{t_3}\right] * T_{M_2}\left[\frac{*}{t_1}, \frac{b}{t_2}, \frac{c}{t_3}\right], 2\right). \quad (3)$$

$$T_R\left[\frac{*}{t_1}, \frac{a}{t_2}, \frac{c}{t_3}\right] = \text{sum}\left(T_{M_1}\left[\frac{b}{t_1}, \frac{a}{t_2}, \frac{*}{t_3}\right] * T_{M_2}\left[\frac{b}{t_1}, \frac{*}{t_2}, \frac{c}{t_3}\right], 1\right). \quad (4)$$

The product $R[100,60] = \Pi_{i=1}^{4} M_i$ of the four matrices $M_1[100,90]$, $M_2[90,80]$, $M_3[80,70]$, and $M_4[70,60]$ is computed by packing the matrices in tile tensors $$T_{M_1}\left[\frac{90}{t_1}, \frac{100}{t_2}, \frac{*}{t_3}\right], T_{M_2}\left[\frac{90}{t_1}, \frac{80}{t_2}, \frac{*}{t_3}\right], T_{M_3}\left[\frac{70}{t_1}, \frac{80}{t_2}, \frac{*}{t_3}\right],$$

and $T_{M_4}\left[\frac{70}{t_1}, \frac{*}{t_3}, \frac{60}{t_3}\right]$ and computing $$T_{X_1}\left[\frac{90}{t_1}, \frac{1?}{t_2}, \frac{60}{t_3}\right] = \text{sum}(T_{M_2} * (\text{sum}(T_{M_3} * T_{M_4}, 1)), 2)$$

$$T_R\left[\frac{*}{t_1}, \frac{100}{t_2}, \frac{60}{t_3}\right] = \text{sum}(T_{M_1} * (rep(\text{clean}(T_{X_1}), 2)), 1)$$

Interleaved Tiling

In some embodiments, the present disclosure provides for a tiling process wherein the tiles do not cover area of the tensor in a sequential, contiguous manner, but rather are spread over the tensor using equal strides.

Another option for tiling is denoted by the symbol "~" in the tile tensor shape. This symbol indicates that the tiles do not cover a contiguous block of the tensor, but are spread out in equal strides. If the dimensions are interleaved, an element of the original tensor $A(c_1, c_2, \ldots, c_k)$ will be mapped to tile indices $a_i = c_i \bmod e_i$, and indices inside the tile $$b_i = \frac{c_i}{e_i}$$

(where $e_i$ is the size of the external tensor).

Figure 4A:
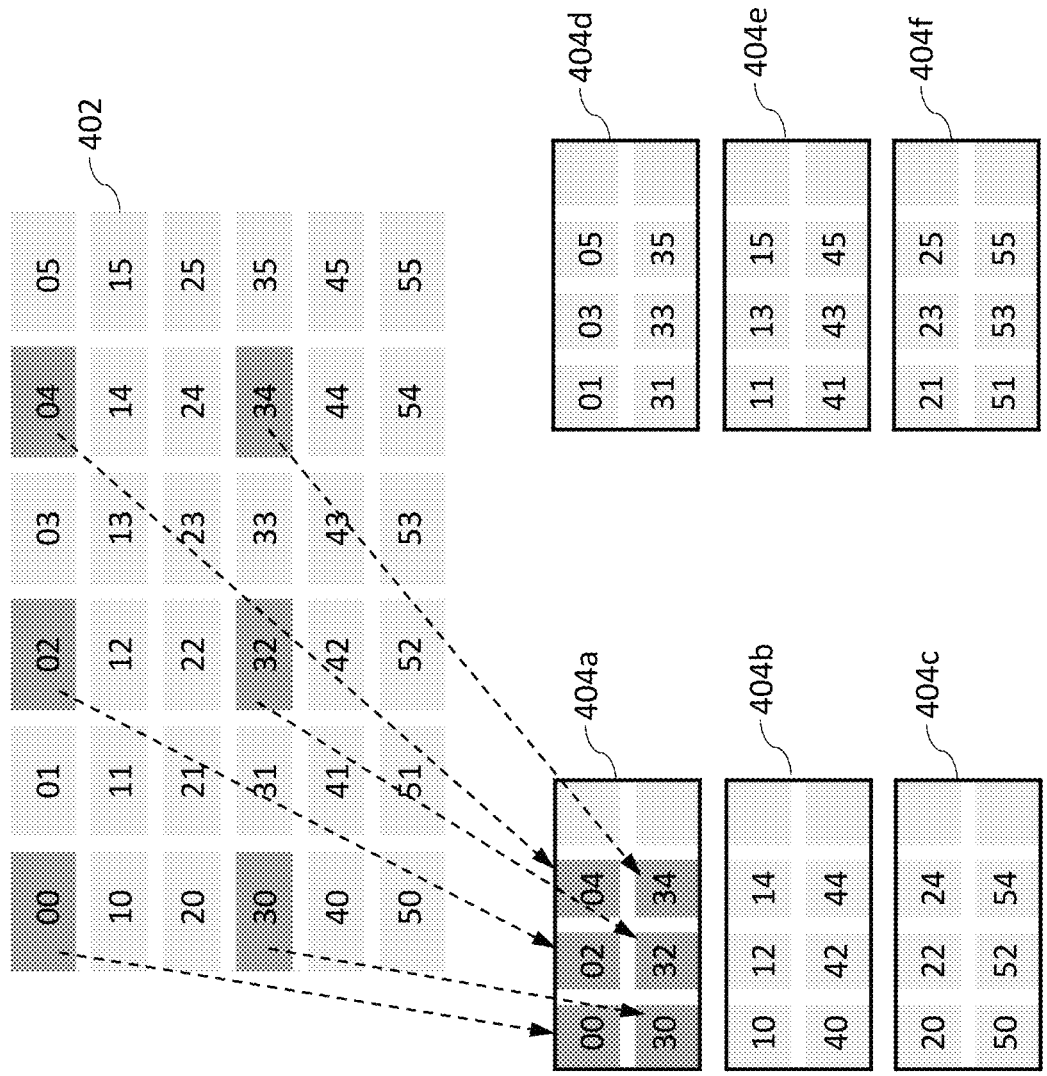
FIG. 4A illustrates an interleaved tiling process, according to some embodiments of the present disclosure.

FIG. 4A illustrates an interleaved tiling process of the present disclosure. As can be seen, input tensor 402 is a matrix M[6,6]. In some embodiments, input matrix 402 may be, e.g., an image, wherein each element in the matrix may be, e.g., an image pixel.

Input tensor 402 is packed using tile tensors 404a-404f of shape [2,4], notated $$T_M\left[\frac{6\sim}{2}, \frac{6\sim}{4}\right].$$

However, the packing is performed in a non-contiguous manner, such that tensor tiles 404a-404f do not cover each a contiguous area of matrix 402. Thus, for example, tile tensor 404a may include matrix 492 elements 00, 02, 04, 30, 32, 34.

Figure 4B:
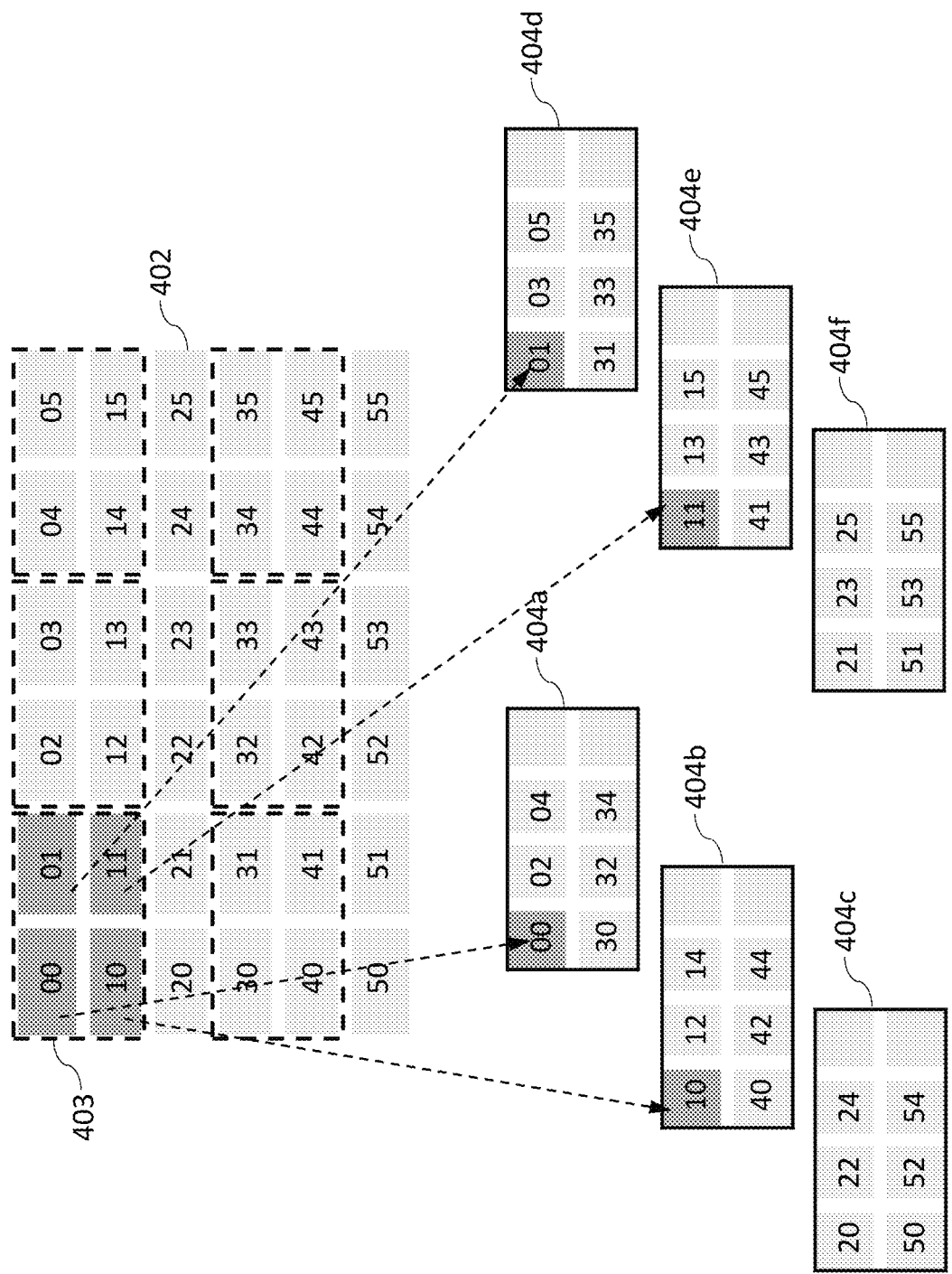
FIGS. 4B and 4C show two 8-parallel kernel evaluations using a 2×2 filter or kernel performed over a matrix, according to some embodiments of the present disclosure.
Figure 4C:
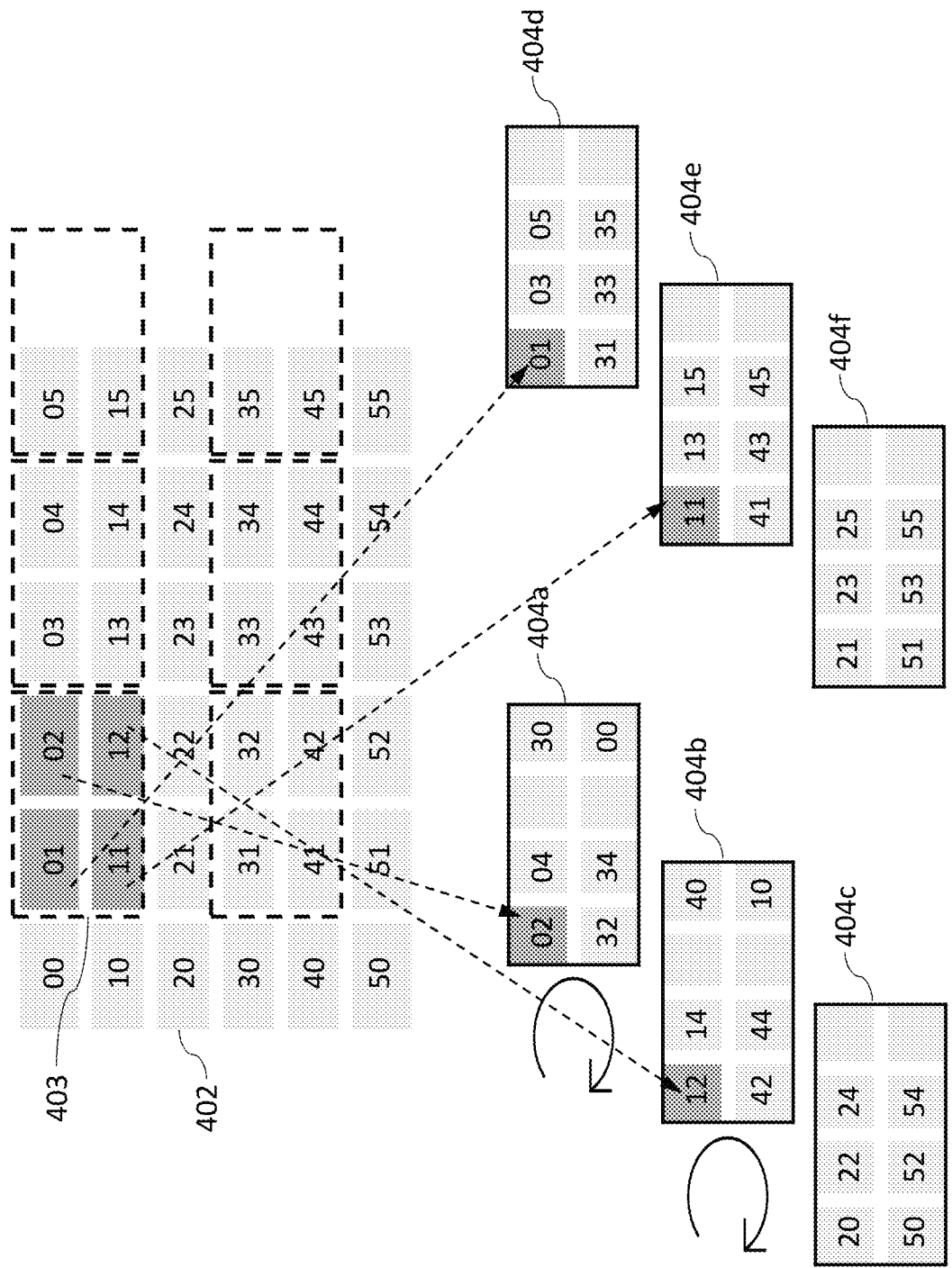

FIGS. 4B and 4C show two exemplary 8-parallel kernel evaluations using a 2×2 filter or kernel performed over matrix 402. The dashed rectangle illustrates the convolution operator of a [2,2] filter or kernel 403 on the M[6,6] matrix 402. The tile tensors 404a-404f illustrate the same operation using tile tensor representation, using component-wise summation of tiles. FIG. 4B illustrates the first convolution iteration, ignoring the empty slots. FIG. 4C illustrates a left circular rotation by 1.

Input tensor 402 is packed using tile tensors 404a-404f of shape [2,4], notated $$T_M\left[\frac{6\sim}{2}, \frac{6\sim}{4}\right].$$

However, the packing is performed in a non-contiguous manner, such that tensor tiles 404a-404f do not cover each a contiguous area of matrix 402. Thus, for example, tile tensor 404a may include matrix 492 elements 00, 02, 04, 30, 32, 34.

FIGS. 4B and 4C show two exemplary 8-parallel kernel evaluations using a 2×2 filter or kernel performed over matrix 402. The dashed rectangle illustrates the convolution operator of a [2,2] filter or kernel 403 on the M[6,6] matrix 402. The tile tensors 404a-404f illustrate the same operation using tile tensor representation, using component-wise summation of tiles. FIG. 4B illustrates the first convolution iteration, ignoring the empty slots. FIG. 4C illustrates a left circular rotation by 1.

In some embodiments, interleaved tiling may be specified separately for each dimension. For example, in $$\left[\frac{5}{2}, \frac{6\sim}{4}\right]$$

only the second dimension is interleaved. Also, although with basic tiling it holds that $$e_i = \frac{n_i}{t_i},$$

for interleaved tiling it is sometimes useful to have larger values for $e_i$. In this case, this value can be explicitly stated using the notation:

$$\frac{n_i \sim e_i}{t_i}.$$

Figure 5A:
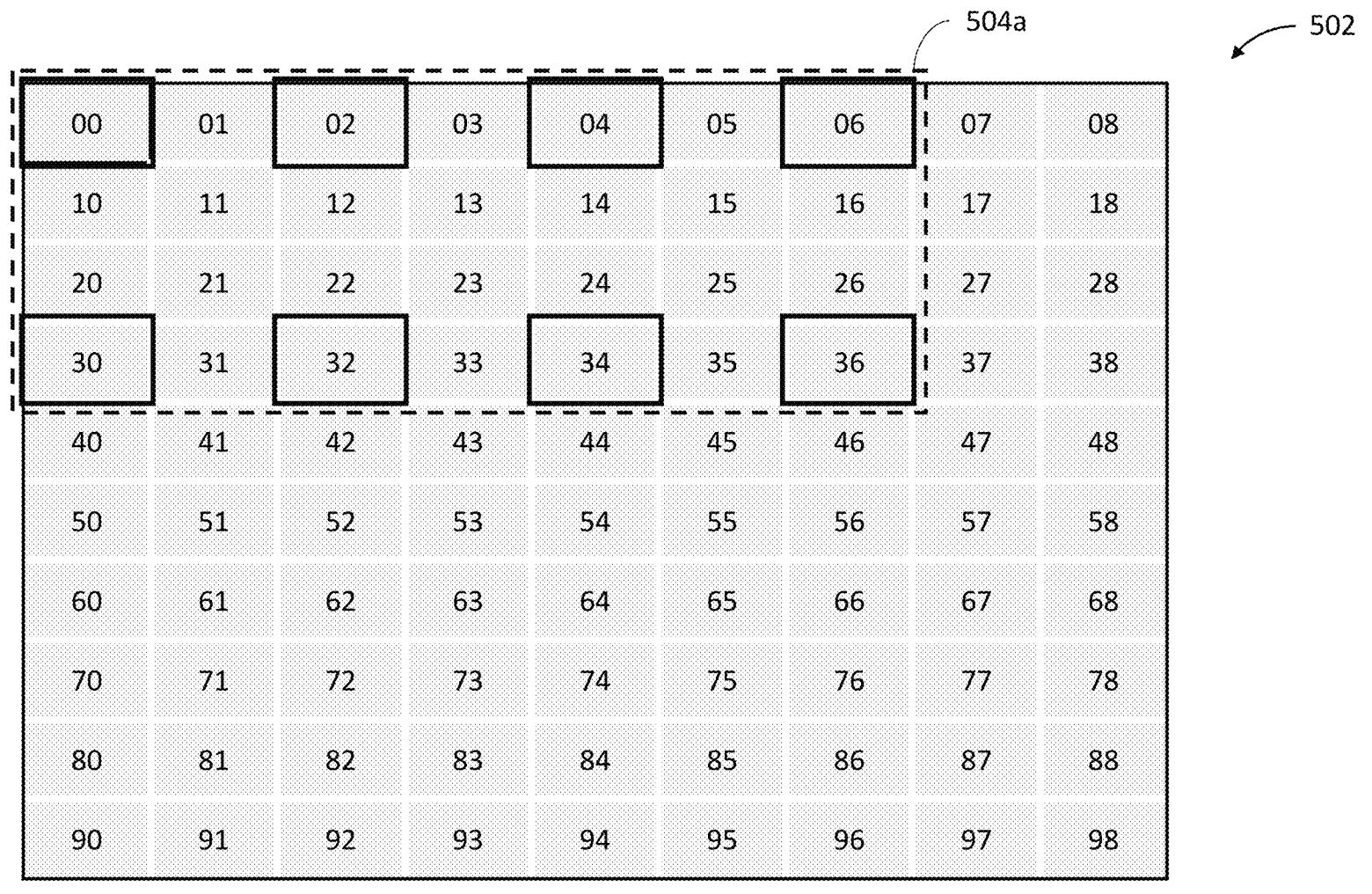
Figure 5B:
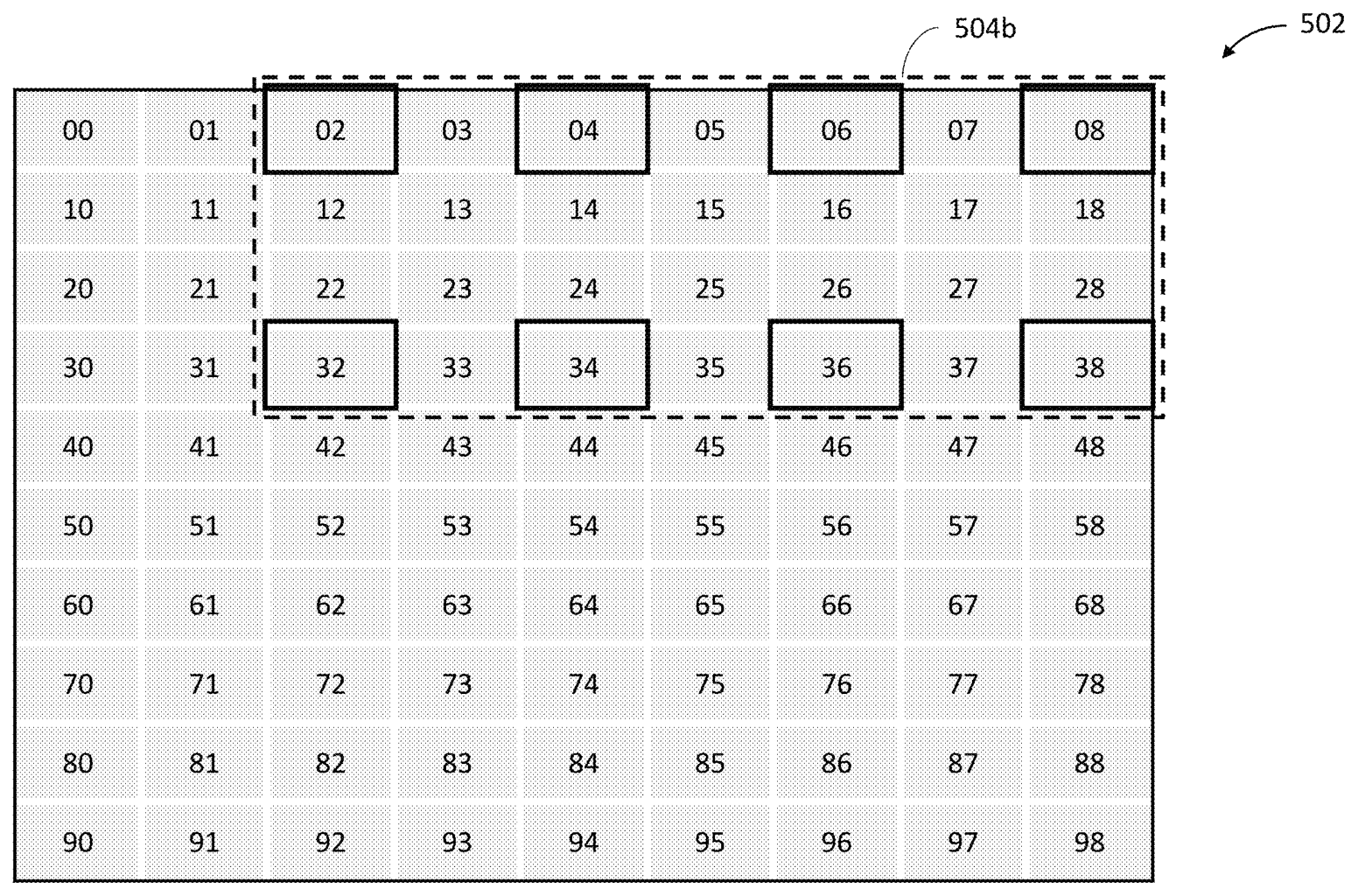
Figure 5C:
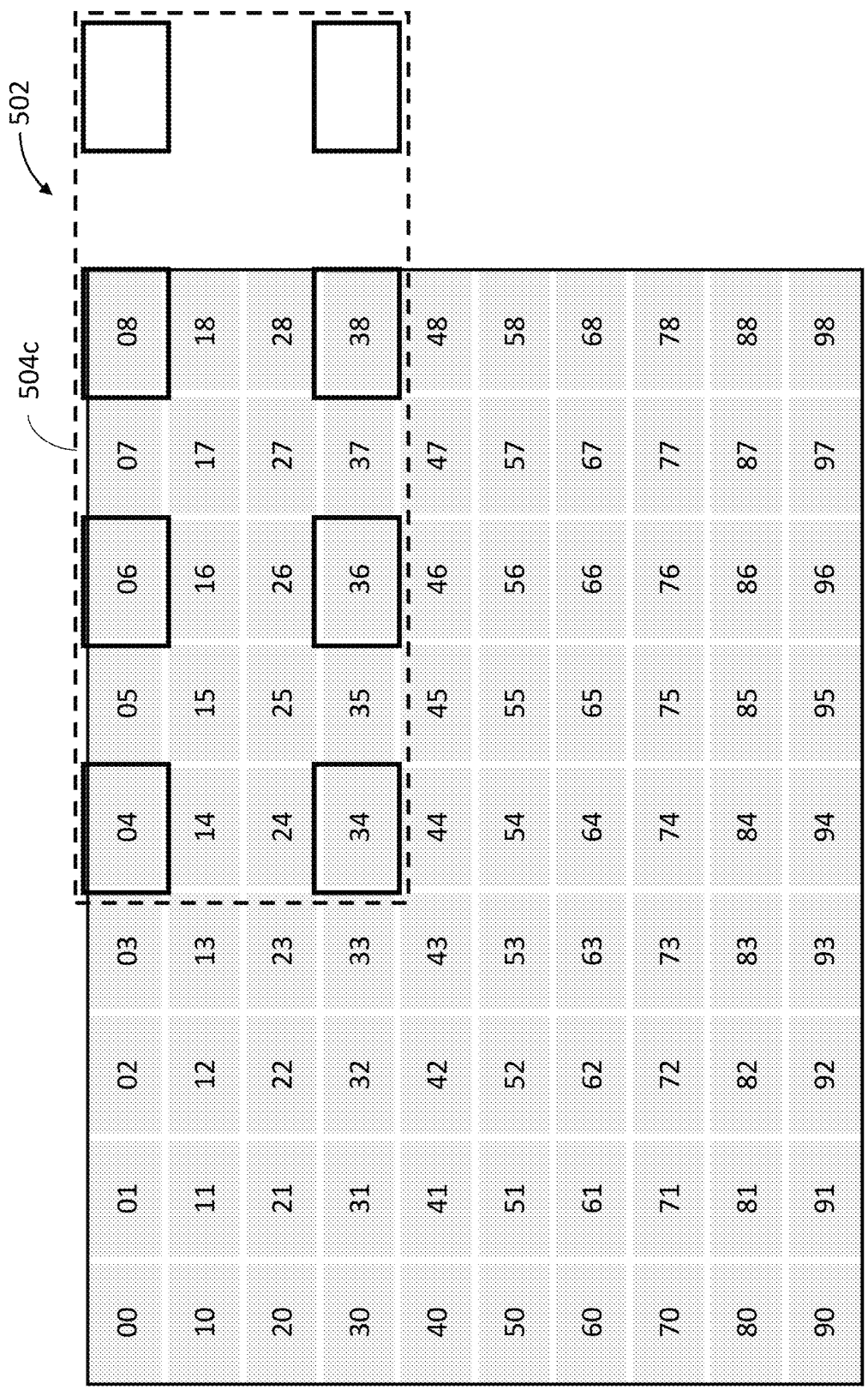

FIGS. 5A-5C illustrate an interleaved tiling operation. In FIG. 5A, matrix 502 of size M[9,10] may be tiled using a tensor tile of size [2,4]. In FIG. 5A, a first tile tensor 504a covers an area of matrix 502 indicated by the dashed line rectangle, however, it does not cover the area in a contiguous manner. Rather, first tile tensor 504a includes matrix elements indicated by solid line rectangles. FIGS. 5B and 5C show tile tensors 504b and 504c, respectively, which are spread over matrix 502 using equal strides.

Figure 6A:
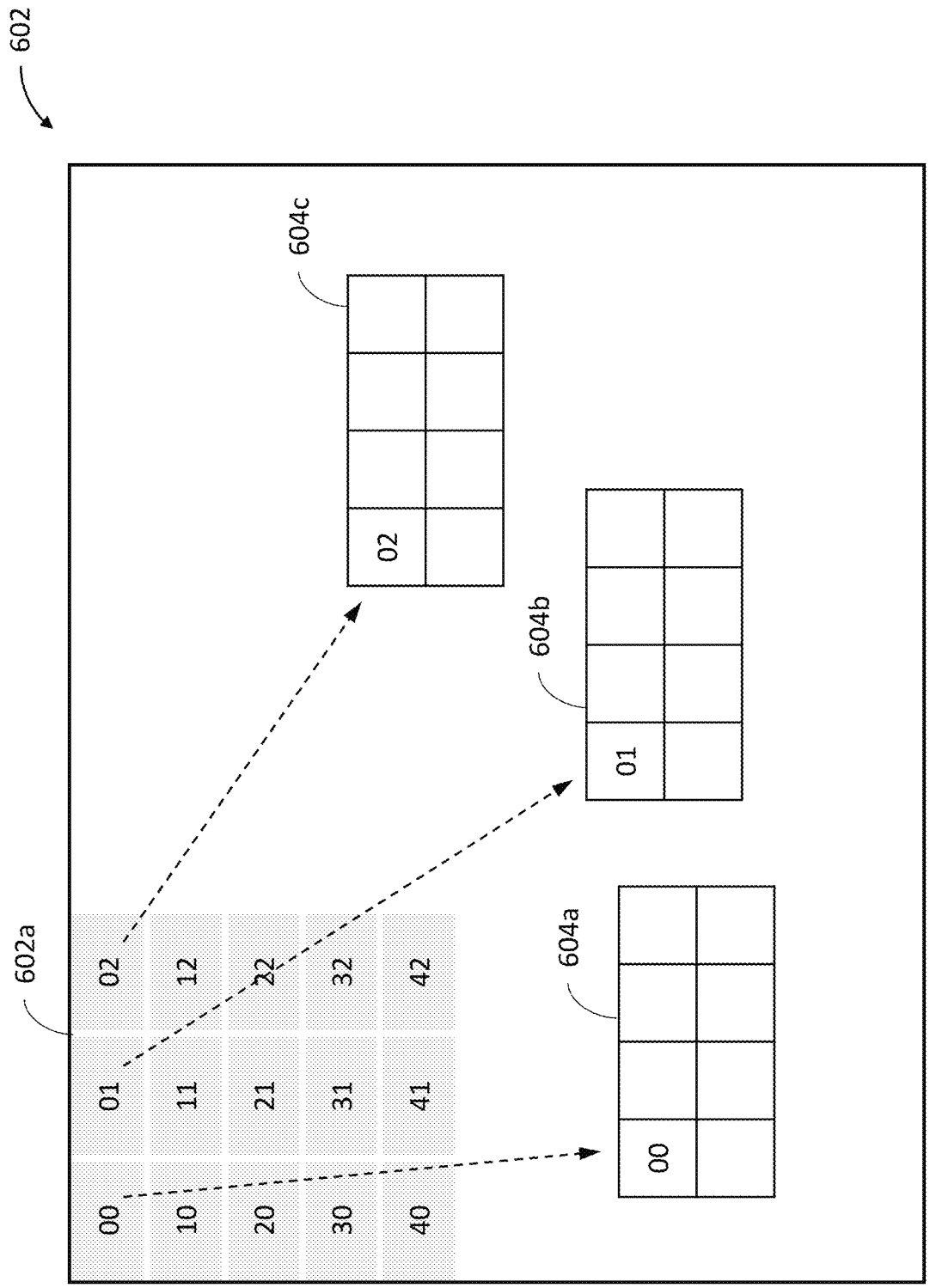
FIGS. 6A-6D are another illustration of an interleaved tiling process of the present disclosure, according to some embodiments of the present disclosure.
Figure 6B:
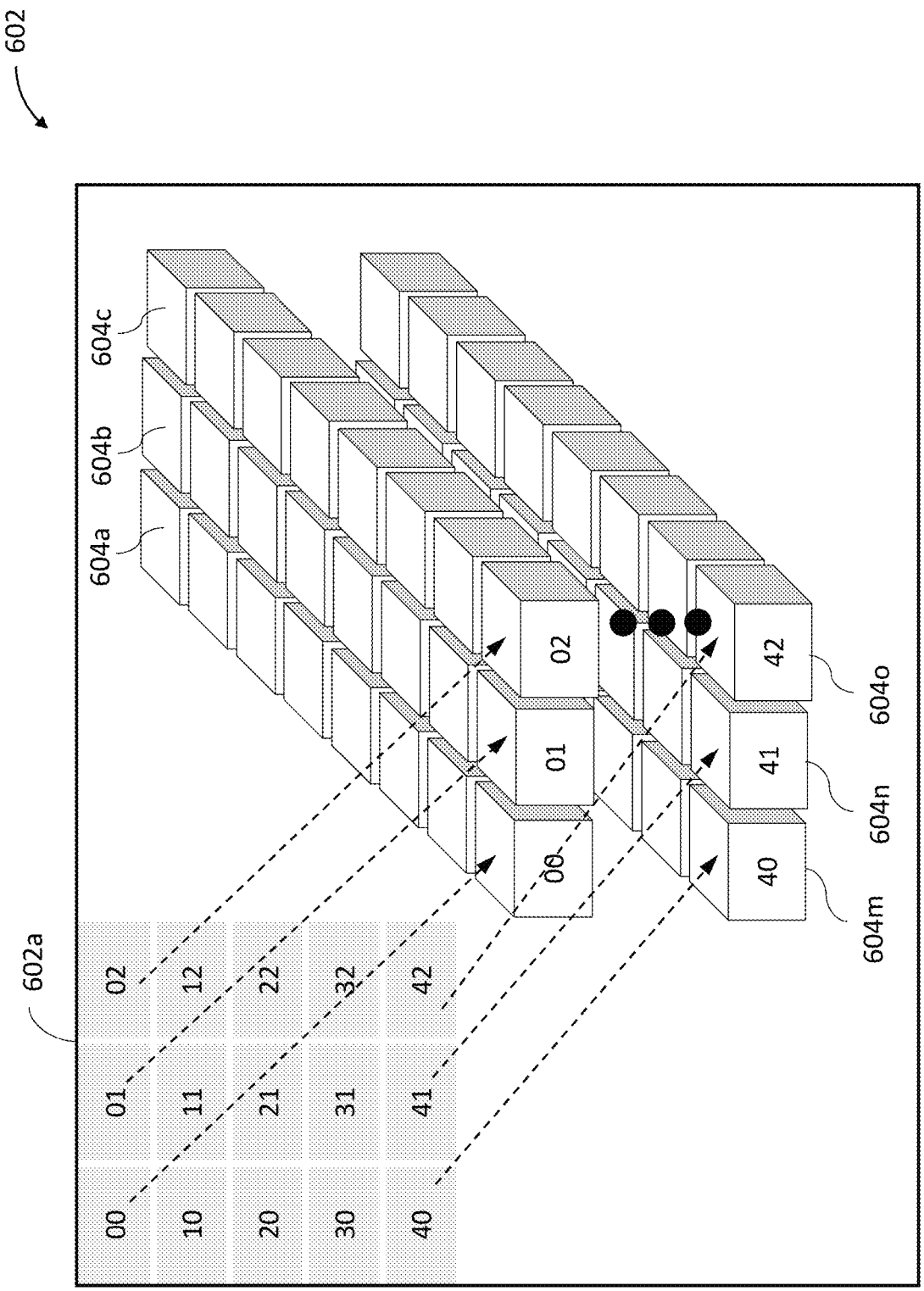
Figure 6C:
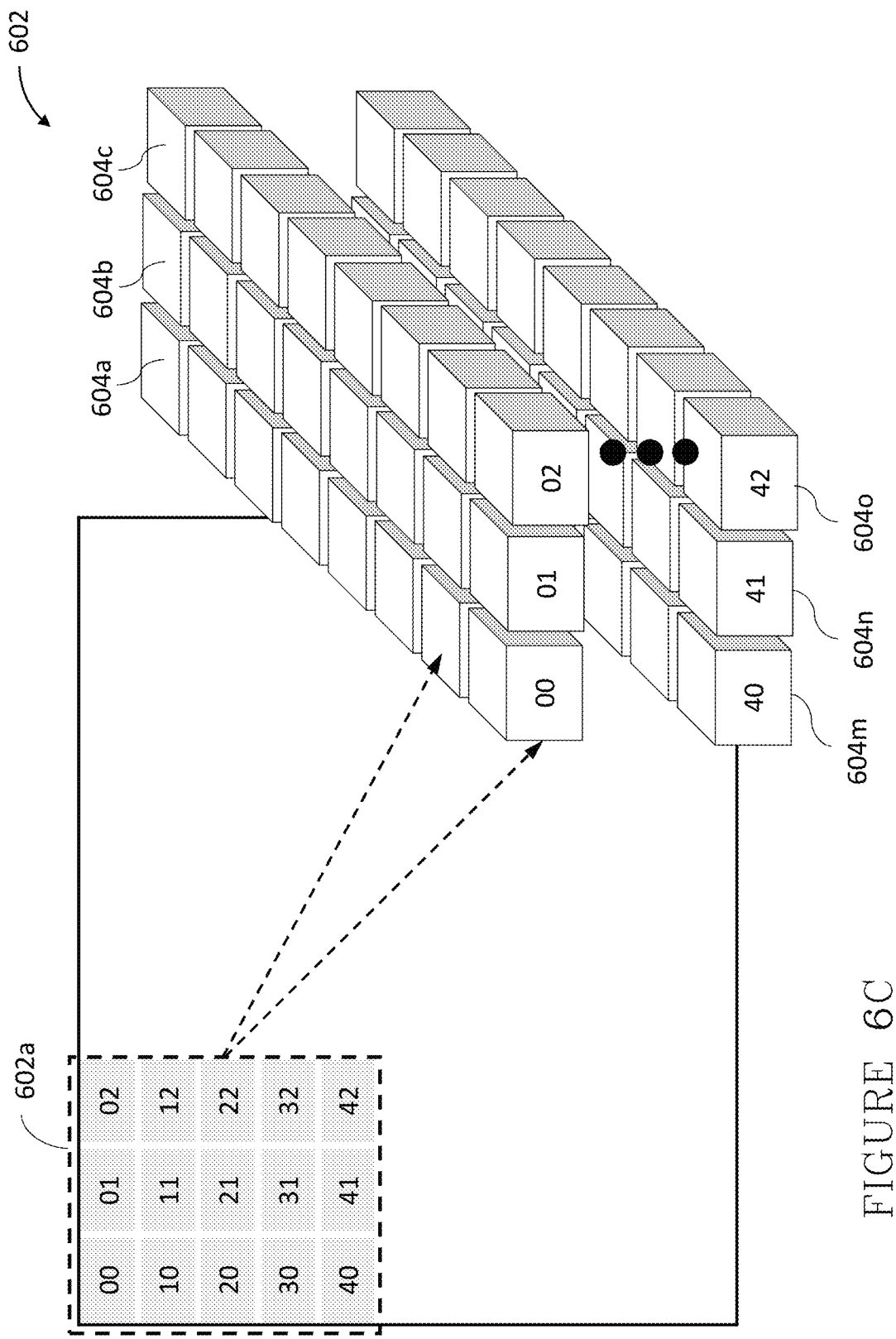
Figure 6D:
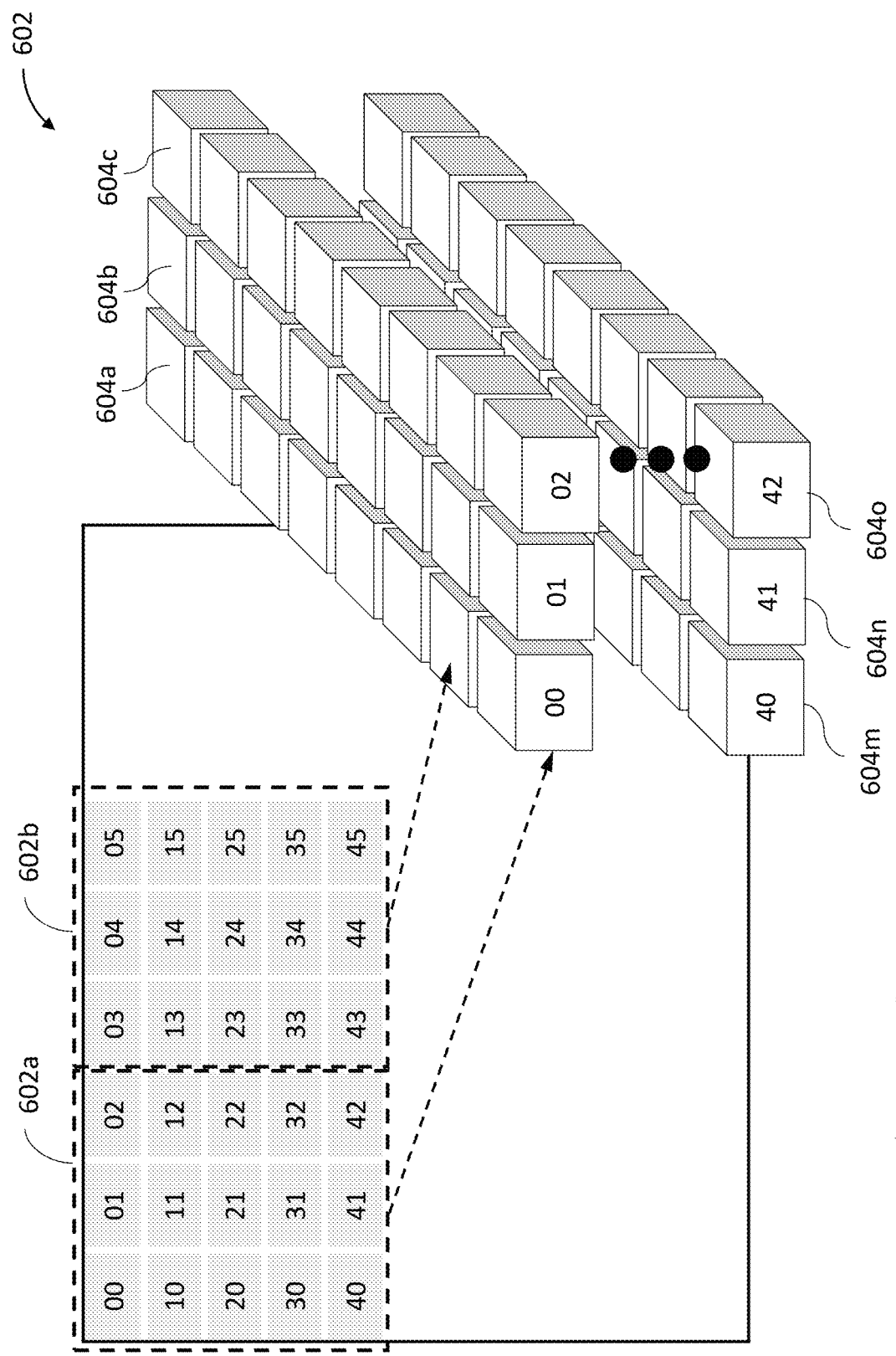

FIGS. 6A-6D also illustrate an interleaved tiling process of the present disclosure. As can be seen, input tensor 602a is a region of matrix 602 covering 3×5 elements. Input tensor 602b may be packed into tile tensors 604, 606, 608. In FIG. 6B, input tensor 602a is packed in an interleaved manner into 15 tile tensors 604a-604o. the elements of region 602a are packed into the first slot in tile tensors 604a-604o. In some embodiments, the same region may be packed in a duplicative manner into all slots of the tile tensors (FIG. 6C). in other embodiments, each tile tensor slot may pack a different region of matrix 602 (FIG. 6D).

Convolution Using Tile Tensors
Background

As noted above, the present disclosure provides for a data packing scheme which permits efficient high-level tensor manipulation operations, such as convolution, over the encrypted data, while reducing computational overhead.

Figure 2A:
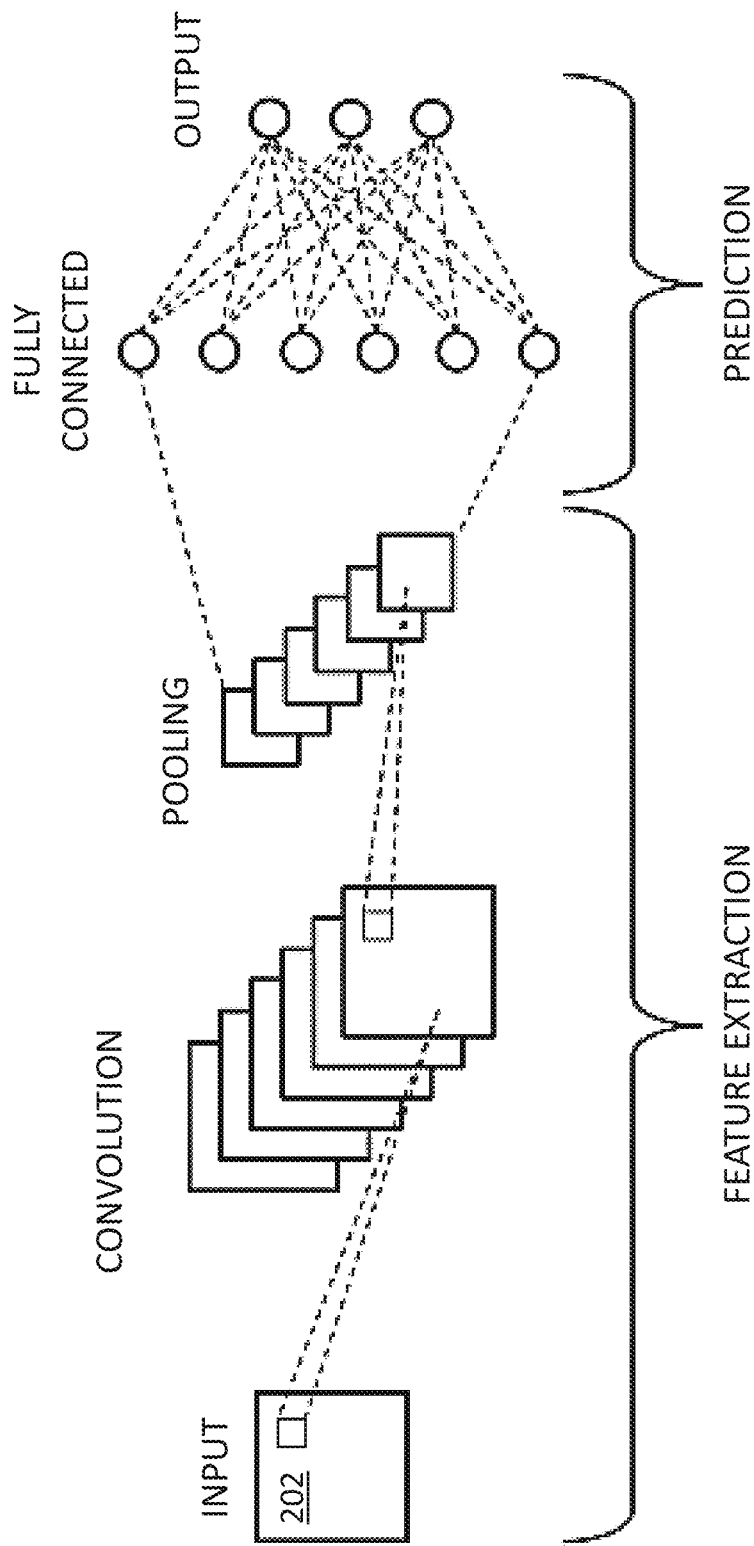
FIG. 2 is a diagram of a basic convolutional neural network architecture.
Figure 2B:
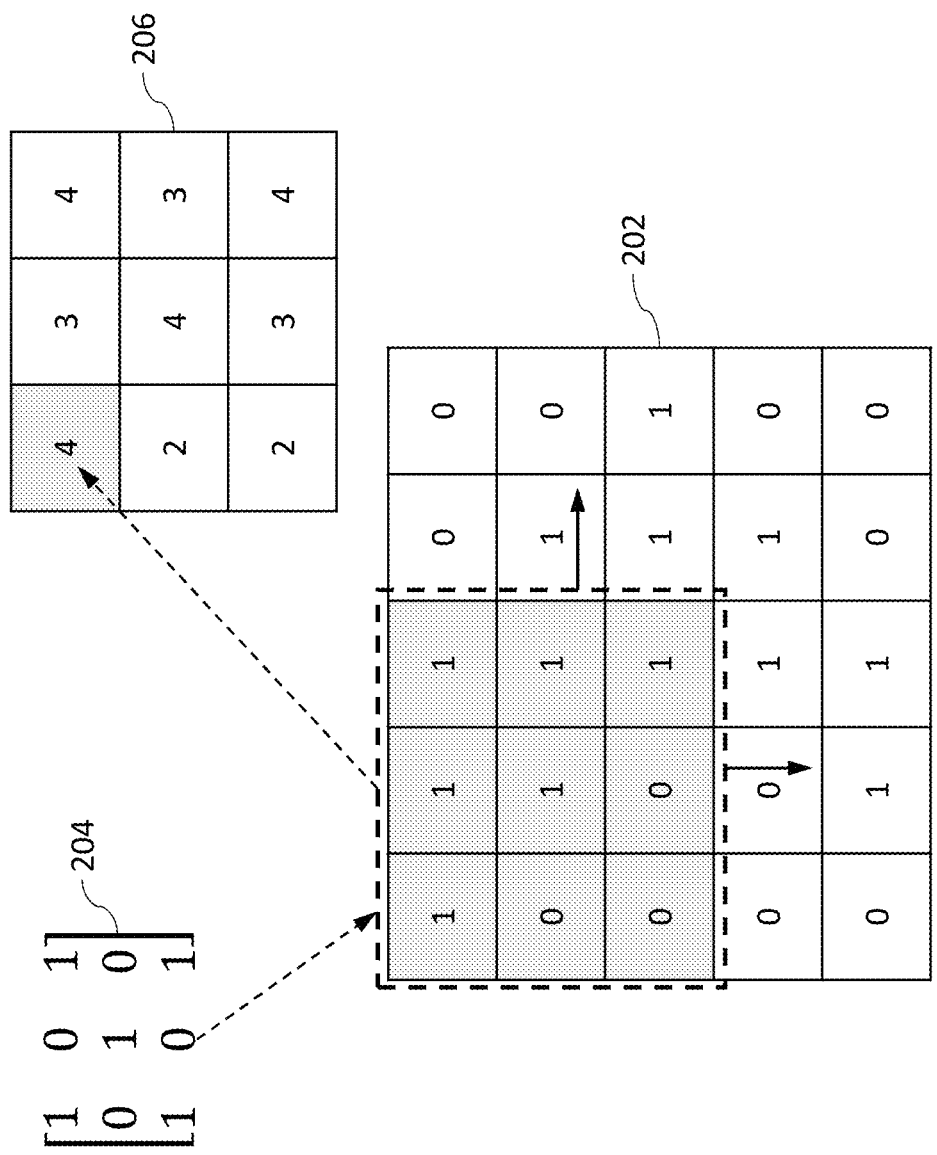

Convolution may be described as a sliding window function applied to a matrix. FIG. 2A is a diagram of a basic convolutional neural network architecture. FIG. 2B illustrates the sliding window (or filter, or kernel) function.

The input of a convolutional layer is often an images tensor, e.g., image tensor 202 in FIGS. 2A and 2B, denoted I[$w_I$, $h_I$, c, b], and a filter tensor F[$w_F$, $h_F$, c, f], e.g., filter 204 in FIG. 2B with the following shape parameters: width $w_I$, $W_F$, height $h_I$, $h_F$, and the number of image channels c (e.g., 3 for an RGB image). In some cases, convolution may be computed for a batch of b images and for f filters. Informally, the convolution operator moves each filter in F as a sliding window over elements of I, starting at position (0,0) and using strides of $\delta_w$ and $\delta_h$. When the filter fits entirely in the input, the inner product is computed between the elements of the filter and the corresponding elements of I. For example, in FIG. 2B, input matrix 202 is a [5,5] matrix which may represent an image, wherein each matrix element corresponds to one pixel (e.g., a value between 0 and 255 for grayscale images). The sliding window 204 may be referred to as the kernel, filter, or feature detector, and is a 3×3 filter. the filter 204 slides over matrix 202 in equal strides of one pixel, multiply its filter values element-wise with the matrix 202 values, then sums them up to output convolved feature 206. To get the full convolution, this is performed for each element by sliding the filter 204 over the whole matrix 202.

Let I[$w_I$, $h_I$, c, b] and F[$w_F$, $h_F$, c, f] be two input tensors for the convolution operator representing images and filters, respectively. The results of the operation O=conv2d(I, F) is the tensor O[$w_O$, $h_O$, f, b], where $$w_O = \frac{w_I - w_F + 1}{\delta_w}, h_O = \frac{h_I - h_F + 1}{\delta_h},$$

$\delta_w$ and $\delta_h$ are the strides and $$O(i, j, m, n) = \sum_{k=0}^{w_F-1} \sum_{l=0}^{h_F-1} \sum_{p=0}^{c-1} I(i \cdot + k, j \cdot + l, p, n) F(k, l, p, m). \quad (5)$$

In the degenerated case where $\delta_w = \delta_h = b = f = c = 1$, Eq(5) can be simplified to $$O(i, j) = \sum_{k=0}^{w_F-1} \sum_{l=0}^{h_F-1} I(i + k, j + l) F(k, l). \quad (6)$$

In FHE settings, it is sometimes useful to convert a convolution operation to a matrix-matrix multiplication by pre-processing the input before encrypting it. One such method is image-to-column, which works as follows for the case c=b=1. Given an image I[$w_I$,$h_I$] and f filters F[$w_F$, $h_F$, f], the operator I', F'=im2col(I, F) computes a matrix I[$w_O h_O$, $w_F h_F$], where each row holds the content of a valid window location in I flattened to a row-vector, and F'[$w_F h_F$, f] contains every filter of F flattened to a column-vector. Here, the tensor O'[$w_O h_O$, f]=I'F' is a flattened version of the convolution result O[$w_O$, $h_O$, f]=conv2d(I, F).

In some embodiments, the present disclosure provides for a variant I", F"=im2col'(I, F) that computes I"[$w_O h_O f$, $w_F h_F$] by consecutively replicating f times every row of I', and F"[$w_O h_O f$, $w_F h_F$] by concatenating $w_O h_O$ times the matrix $F'^T$. The tensor O"[$w_O h_O f$, 1]=sum(I"*F", 2) contains the convolution result O[$w_O$, $h_O$, f]. The advantage of this variant is that the output is fully flattened to a column vector, which is useful in situations where flattening is costly (e.g., in FHE). The drawback of this variant method is that it is impossible to perform two consecutive convolution operators without costly pre-processing in between.

In some embodiments, the present disclosure provides for a novel method to compute convolution over FHE data. In some embodiments, the present method provides for greater efficiency when the input is a large image, and allows for efficient computation of consecutive convolution layers in a FHE only system.

Convolution with Interleaved Tile Tensors

In some embodiments, the present disclosure provides for using interleaved tile tensors, as detailed above, to efficiently compute convolution over FHE data.

With reference back to FIGS. 4A-4C, matrix M[6,6] 402 is packed using 6 different tile tensors 404a-404f denoted $$T_M\left[\frac{6}{2}\tilde{\,}, \frac{6}{4}\tilde{\,}\right].$$

Here, the tile shape is [2,4] and the external tensor shape, i.e., the total number and arrangement of tile tensors used to pack matrix 402 is [3,2]. Every tile contains a 2×4 submatrix, but instead of being contiguous, it comprises a set of matrix elements spaced evenly in the matrix. For example, as can be seen in FIG. 4B, the elements 00,01,10,11,20,21 are all mapped to the same slot in the different tile tensors 404a-404f. In other words, the matrix 402 region indicated by a dashed line rectangle 403 is all mapped to the upper left slot in each of tile tensors 404a-404f.

The interleaved packing allows for a more efficient implementation of Equation 6 above with respect to runtime and storage. Intuitively, SIMD was used to compute multiple elements of the output in a single operation. The filter is packed simply as $$T_F\left[w_F, h_F, \frac{*}{t_1}, \frac{*}{t_2}\right],$$

i.e., it has $w_F h_F$ tiles, each containing one value of the filter in all slots. This allows multiplying each image tile with each value of the filter.

For example, FIG. 4B shows a computation of the convolution output when a [2,2] filter 403, indicated by dashed line rectangle, is placed at the top left position of matrix 402. The SIMD nature of the computation computes the output in other regions as well. The result is a single tile, where each slot contains the convolution result of the corresponding region, such that this tile is packed in the same interleaved packing scheme as the input tiles.

A more complicated example is given in FIG. 4C. Here the filter 403 is placed one pixel to the right. As a result, the filter 403 needs to be multiplied by elements that appear in different regions, i.e. they are mapped to slots of different indices. In this case, the tiles need to be rotated appropriately. For example, placing the filter with its upper left corner on pixel (01), the convolution is computed using the (0,0) slot of tiles 404d and 404e, and slot (0,1) of tiles 404a and 404b. accordingly, tiles 404a and 404b are therefore rotated to move the required value to slot (0,0) as well.

The total cost of convolution when using this packing is summarized in the following lemma:

Let s be the number of slots in a ciphertext. Then, given an input image I[$w_I$, $h_I$] and a filter F[$w_F$, $h_F$], packing I as $$T_I\left[\frac{w_I}{t_1}\tilde{\,}, \frac{h_I}{t_2}\tilde{\,}\right]$$

and the filter as $$T_F\left[w_F, h_F, \frac{*}{t_1}, \frac{*}{t_2}\right],$$

convolution can be computed using: $O(w_I h_I w_F h_F/s)$ multiplications, and $$O\left(w_F\frac{w_I}{t_1} + h_F\frac{h_I}{t_2} + w_F h_F\right)$$

rotations. The input is encoded in $O(w_I h_I/s)$ ciphertexts.

Proof: Multiplications. To compute the convolution, each of the $w_I h_I$ elements of the input tensor must be multiplied with each of the $w_F h_F$ elements of the filter, excluding edge cases that do not change the asymptotic behavior. Since each multiplication multiplies s slots, only $O(w_I h_I w_F h_F/s)$ multiplications are needed.

Rotations. Recall the output is of size ($w_I$−$w_F$+1)($h_I$−$h_F$+1). The k-th slot of different ciphertexts is mapped to elements of I with indexes $$k\frac{w_I}{t_1} \leq x_o < (k+1)\frac{w_I}{t_1} \text{ and } k\frac{h_I}{t_2} \leq y_o < (k+1)\frac{h_I}{t_2}.$$

It is therefore enough to analyze the cost of computing the convolution for $$0 \leq x_o < \frac{w_O}{t_1} \text{ and } 0 \leq y_o < \frac{h_O}{t_2},$$

since computing the other elements of the output has no cost due to the SIMD feature. It follows that a rotation is needed when $$x_o + i \geq \frac{w_I}{t_1} \text{ or } y_o + j \geq \frac{h_I}{t_2}.$$

This totals to $$O\left(w_F\frac{w_I}{t_1} + h_F\frac{h_I}{t_2} + w_F h_F\right).$$

Storage. Because O(s) slots of each ciphertext are used, the input can be encoded in $O(w_I h_I/s)$ ciphertexts.

The output of the convolution is a tile tensor $$T_O\left[\frac{w_O \sim ?}{t_1}, \frac{h_O \sim ?}{t_2}\right].$$

The unknown values are introduced by filter positions that extend beyond the image, as shown in FIG. 4C. Note further that the external sizes $$e_1 = \frac{w_I}{t_1} \text{ and } e_2 = \frac{h_I}{t_2}$$

of the tile tensor $T_I$ remain the same in $T_O$, and they may be larger than those actually required to hold the tensor $O[w_O, h_O]$. Hence, a more accurate depiction of $T_O$'s shape is $$T_O\left[\frac{w_O \sim e_1?}{t_1}, \frac{h_O \sim e_2?}{t_2}\right],$$

however, this may be ignored in practice.

Handling Strides, Batching and Multiple Channels and Filters

In some embodiments, the present convolution algorithm may be extended to handle multiple channels (e.g., images having multiple color channels, such as RGB images having red, green, and blue channels), multiple filters, and batching (e.g., processing multiple images together).

Let a received input data be a tensor of images $I[w_I, h_I, c, b]$, where c is the number of channels and b is the batch size. The input is then packed as $$T_I\left[\frac{w_I \sim}{t_1}, \frac{h_I \sim}{t_2}, \frac{c}{t_3}, \frac{b}{t_4}, \frac{*}{t_5}\right],$$

together with filters $F[w_F, h_F, c, f]$, where f is the number of filters, as $$T_F\left[w_F, h_F, \frac{*}{t_1}, \frac{*}{t_2}, \frac{c}{t_3}, \frac{*}{t_4}, \frac{f}{t_5}\right],$$

where $t_i \in \mathcal{N}$ and $\Pi t_i = s$.

The convolution is computed similarly to the description above, multiplying tiles of $T_I$ with the appropriate tiles of $T_F$. The result is a tile tensor of shape $$T_O\left[\frac{w_O \sim ?}{t_1}, \frac{h_O \sim ?}{t_2}, \frac{c}{t_3}, \frac{b}{t_4}, \frac{f}{t_5}\right].$$

Summing over the channel (i.e., third) dimension using $$O\left(\frac{w_O}{t_1}\frac{h_O}{t_2}\frac{b}{t_4}\frac{f}{t_5}\log t_3\right)$$

rotations, to obtain $$T_O\left[\frac{w_O \sim ?}{t_1}, \frac{h_O \sim ?}{t_2}, \frac{1?}{t_3}, \frac{b}{t_4}, \frac{f}{t_5}\right].$$

For bigger strides, >1 (resp. >1), it is required that either $$t_1 = 1 \text{ (resp. } t_2 = 1\text{) or } \frac{h_I}{t_2} \bmod = 0 \left(\text{resp. } \frac{w_I}{t_1} \bmod = 0\right).$$

Then, the implementation trivially skips ciphertexts in every row and ciphertexts in every column.

A Sequence of Convolutions

In some embodiments, the present disclosure provides for implementing a sequence of multiple convolution layers. This is something that is common in neural networks. One of the advantages of the tile tensor method is that the output of one convolution layer can be easily adjusted to be the input of the next convolution layer.

In some embodiments, an input may be a batch tensor $I[w_I, h_I, c, b]$ and a sequence of convolution layers with the l'th layer having a filter tensor $F^l[w_F^l, h_F^l, c^l, f^l]$. For the first layer, $c^1=c$, and, for subsequent layers l>1, $c^l=f^{l-1}$. As before, the input tensor may be packed as $$T_I\left[\frac{w_I \sim}{t_1}, \frac{h_I \sim}{t_2}, \frac{c}{t_3}, \frac{b}{t_4}, \frac{*}{t_5}\right].$$

For odd layers, l=2l+1, the filter tensor may be packed as $$T_F^l\left[w_F^l, h_F^l, \frac{*}{t_1}, \frac{*}{t_2}, \frac{c}{t_3}, \frac{*}{t_4}, \frac{f^l}{t_5}\right].$$

The output is then $$T_O\left[\frac{w_O^l \sim ?}{t_1}, \frac{h_O^l \sim ?}{t_2}, \frac{1?}{t_3}, \frac{b}{t_4}, \frac{f^l}{t_5}\right].$$

For even layers, l=2l, the filters may be packed as:

$$T_F^l\left[w_F^l, h_F^l, \frac{*}{t_1}, \frac{*}{t_2}, \frac{f}{t_3}, \frac{*}{t_4}, \frac{c}{t_5}\right].$$

As can be seen, the shapes of the layer outputs do not match the shapes of the inputs of the subsequent layers. Accordingly, in some embodiments, the present disclosure provides for adjusting an output of an odd layer to be suitable for the next even layer. For this, in some embodiments, the present disclosure provides for clearing the unknowns by multiplying with a mask, and then replicating the channel dimension. The result is a tile tensor of this shape:

$$T_O\left[\frac{w_O^l \sim ?}{t_1}, \frac{h_O^l \sim ?}{t_2}, \frac{*}{t_3}, \frac{b}{t_4}, \frac{f^l}{t_5}\right],$$

which matches the input format of the next layer, because $f^l=c^{l+1}$. To make an output of an even layer suitable for the next odd layer, the present disclosure similarly cleans and replicates along the filter dimension.

It may be noted that changing the order of the dimensions leads to a small improvement. The improvement comes because summing over the first dimension ends up with a replication over this dimension. Therefore, setting the channel dimension as the first dimension saves the replication step when preparing the input to an even layer. In some embodiments, cleaning may be skipped as well, because the unknown values along the image width and height dimensions do not affect the result. Alternatively, the filter dimension can be set as first and then the replication step can be skipped when preparing the input for an odd layer.

Naive Convolution Methods The above method reduces to a simple method known by various names such as SIMD packing when $t_1=t_2=t_3=t_5=1$. In this case, every element in the tensors for the images and filters is stored in a separate ciphertext, and the slots are only used for batching. In some embodiments, the reduction to matrix multiplication as described above may also be used, however, it may only be applicable in the case of neural networks with one convolutional layer.

Experimental Results

The present inventors conducted experiments using two benchmark neural network models:

CryptoNets (see, Ran Gilad-Bachrach, et al. Cryptonets: Applying neural networks to encrypted data with high throughput and accuracy. In International Conference on Machine Learning, pages 201-210, 2016.). This network has a convolutional layer followed by two fully connected layers.

AlexNet AlexNet (see, Alex Krizhevsky et al. Imagenet classification with deep convolutional neural networks. Neural Information Processing Systems, 25, 01 2012.)

The models were trained on the MNIST (see, Yann LeCun, et al. The MNIST database of handwritten digits. 10:34, 1998) and COVIDx CT-2A (see, Hayden Gunraj, et al. Covidnet ct-2: Enhanced deep neural networks for detection of covid-19 from chest CT images through bigger, more diverse learning. arXiv preprint arXiv:2101.07433, 2021) data-sets, respectively.

The results are reported herein with respect to performing model inference using these model weights in encrypted and unencrypted forms. AlexNet was sued to demonstrate the power of the present disclosure, and CryptoNets was used to demonstrate the effect of different packing on the computation performance and memory.

The experiments were run using a computer running an Intel Xeon CPU E5-2699 v4 @ 2.20 GHz, with 44 cores (88 threads) and 750 GB memory. The experiments used the CKKS SEAL implementation targeting 128 bits security, and all the reported results are the average of at least 10 runs.

CryptoNets Results

The CryptoNets model was implemented using tile tensors of shape $$\left[\frac{n_1}{t_1}, \frac{n_2}{t_2}, \frac{b}{t_3}\right],$$

where b is the batch size. In practice, reported are only the results for the case $t_3=b$ that minimizes the overall latency by filling all the ciphertext slots (8192 in this case). For the convolution layer, the naïve SIMD method was used, when b equals the number of plaintext slots and $t_1=t_2=1$. Otherwise, the present variant of the im2col operator was used (see above). These methods work better than the present novel convolution operator when the images are small and the network has one convolutional layer.

Figure 7:
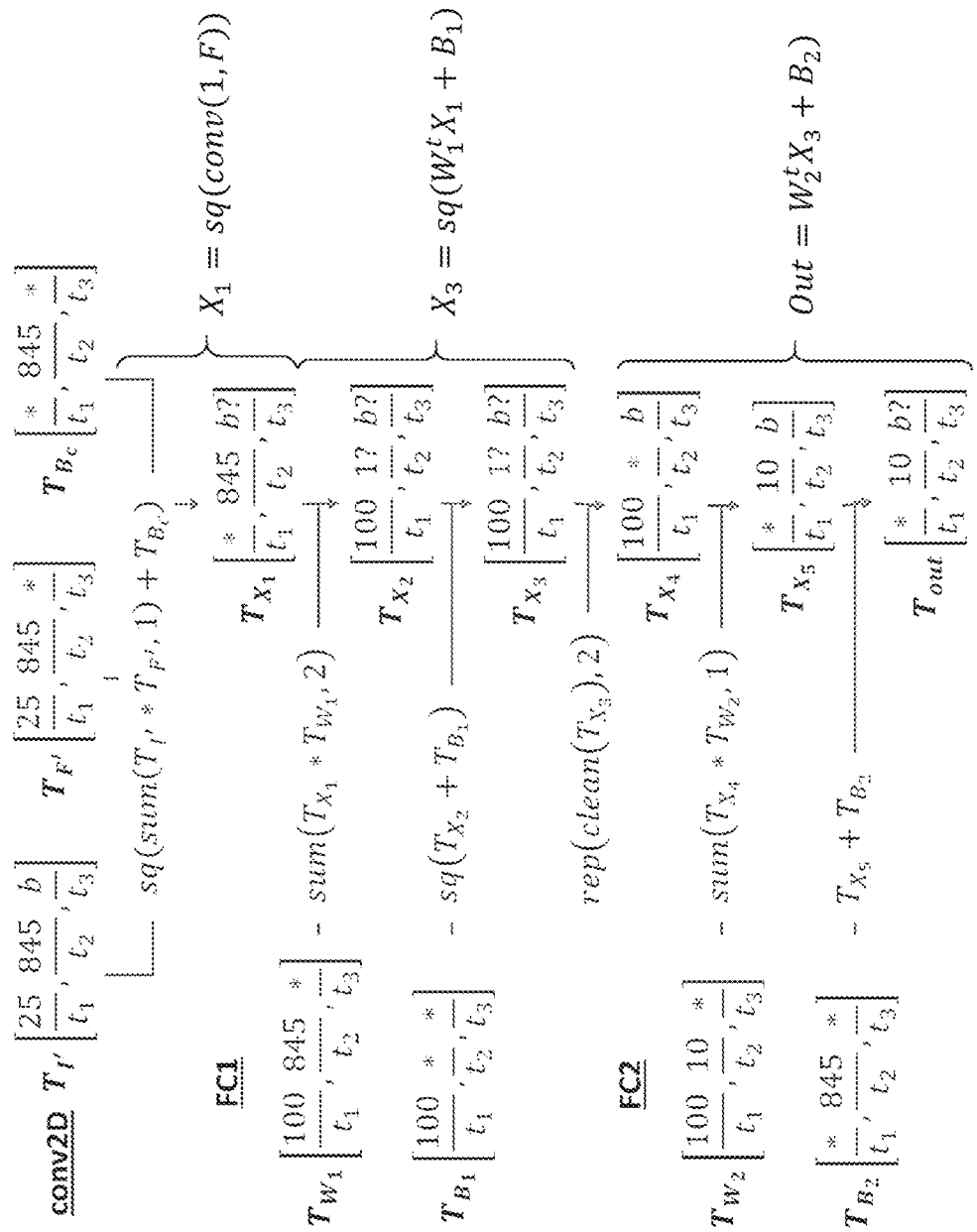
FIG. 7 is an illustration of experimental results with respect to CryptoNets implementation using tile tensors.

FIG. 7 is an illustration of the present CryptoNets implementation using tile tensors. For simplicity, only the component-wise square activation layers are indicated by the sq( ) function because they maintain the tile tensor shape. The equations on the right represent the underlying tensor operations. The input tensors are I, F, $B_c$, $W_1$, $B_1$, $W_2$, $B_2$, where I', F'=im2col'(I, F). FIG. 7 shows the tile tensor flow in the present implementation. Here, the inputs I and F are the image and filter matrices, respectively, and I', F'=im2col'(I, F). In addition, $B_c$ is the trained bias of the convolution layer and $W_1$, $W_2$, $B_1$, $B_2$ are the trained weights and bias info of the FC layers.

Table 1 reports the latency and memory usage for performing a model inference with different tile shapes when $t_3=b=1$. For brevity, $t_1$ is only considered to be at the extreme points (e.g., $t_1=1,8192$) or $t_1$ values that led to optimal solution, and some additional samples. The optimal latency and memory usage are achieved for $t_1=32$, which allows packing the tensors I, F, $W_1$ using the minimal number of tiles.

Table 2 reports the latency, amortized latency, and memory usage for performing a model inference with different $t_3=b$ values. For every such value, reported are only the $t_1$, $t_2$ values that led to the optimal solutions. Unlike the case where b=1, here every choice of $t_3$ leads to a different trade-off between the performance measures. For example, when increasing $t_3$, the latency and memory consumption increase, but the per-sample amortized latency decreases. The encryption and decryption time also increase with $t_3$, except for the case $t_3=8192$, where the naive SIMD convolution operator is used.

TABLE 1

Running a model inference with different tile shapes [$t_1$, $t_2$, $t_3$] when $t_3$ = b = 1.

| $t_1$ | $t_2$ | $t_3$ | Latency (sec.) | Enc + Dec (sec.) | Memory (GB) |
|---|---|---|---|---|---|
| 1 | 8192 | 1 | 0.86 | 0.04 | 1.58 |
| 8 | 1024 | 1 | 0.56 | 0.04 | 0.76 |
| 32 | 256 | 1 | 0.56 | 0.04 | 0.73 |
| 64 | 128 | 1 | 0.57 | 0.04 | 0.77 |
| 128 | 64 | 1 | 0.61 | 0.04 | 0.94 |
| 256 | 32 | 1 | 0.68 | 0.05 | 1.37 |
| 1024 | 8 | 1 | 1.93 | 0.14 | 3.17 |
| 8192 | 1 | 1 | 11.10 | 0.80 | 14.81 |

The reported values are the inference latency, the encryption and decryption time, and the memory usage peak.

TABLE 2

| $t_1$ | $t_2$ | $t_3$ | Latency (sec.) | Amortized Latency (sec.) | Enc + Dec (sec.) | Memory (GB) |
|---|---|---|---|---|---|---|
| 32 | 256 | 1 | 0.56 | 0.56 | 0.04 | 0.73 |
| 16 | 128 | 4 | 0.56 | 0.14 | 0.05 | 1.20 |
| 8 | 64 | 16 | 0.6 | 0.037 | 0.10 | 2.49 |
| 4 | 32 | 64 | 0.95 | 0.015 | 0.24 | 6.62 |
| 1 | 32 | 256 | 1.94 | 0.008 | 0.70 | 16.38 |
| 1 | 8 | 1024 | 5.6 | 0.0055 | 2.68 | 61.45 |
| 1 | 2 | 4096 | 21.57 | 0.0053 | 12.55 | 242.46 |
| 1 | 1 | 8192 | 41.32 | 0.005 | 1.29 | 354.47 |

Running a model inference with different tile shapes [$t_1$, $t_2$, $t_3$], reporting only the optimal $t_1$ and $t_2$ choices for a range of different $t_3$ = b values. The reported values are: the inference latency, the amortized latency (latency/b), the encryption and decryption time, and the memory usage peak.

AlexNet Benchmark

For the AlexNet benchmark, a variant of AlexNet network is used, which includes 5 convolution layers, 3 fully connected layers, 7 ReLU activations, 3 Batch Normalization layers, and 3 Max Pooling layers. A CKKS-compliant variant of AlexNet was created by replacing the ReLU and Max Pooling components with a scaled square activation and Average Pooling correspondingly along with some additional changes. It was trained and tested on the COVIDx CT-2A dataset. The COVIDx CT-2A dataset is an open access benchmark of CT images dataset that contains three classes of chest CT images: Normal, Pneumonia, and COVID-19 cases. The experiments used a subset of 10,000 images per class for training, 1,000 images per class for validation, and 201 images in total for test with 67 random samples from each class. The images were resized to 224*224*3 to fit the input size expected by AlexNet.

The biases were packed in 5-dimensional tile tensors with compatible shapes, allowing us to add them to the convolution outputs. The fully connected layers were handled using the matrix-matrix multiplication technique (see above). The input to these layers arrives from the convolutional layers as a 5-dimensional tile tensor, $$\left[\frac{*}{t_1}, \frac{1\sim}{t_2}, \frac{1\sim}{t_3}, \frac{256}{t_4}, \frac{b}{t_5}\right].$$

Therefore, the first fully connected layer is packed in 5 dimensions as well:

$$\left[\frac{4096}{t_1}, \frac{1\sim}{t_2}, \frac{1\sim}{t_3}, \frac{256}{t_4}, \frac{b}{t_5}\right].$$

Its output, $$\left[\frac{4096}{t_1}, \frac{1\sim}{t_2}, \frac{1\sim}{t_3}, \frac{1?}{t_4}, \frac{b}{t_5}\right],$$

is replicated along dimensions 2 through 4, then flattened using the flatten operator to $$\left[\frac{4096}{t_1}, \frac{*}{t_2 t_3 t_4}, \frac{b}{t_5}\right],$$

from which it may continue normally.

The accuracy of running regular AlexNet and the HE-friendly AlexNet were measured using PyTorch (PyTorch library 1.5.1, see https://pytorch.org) over a plaintext test-set. The results were 0.861 and 0.806, respectively. No additional accuracy degradation was observed when running the HE-friendly AlexNet using the present framework over encrypted data.

Table 3 reports the time and memory consumption for the latter experiment using 4 configurations on a set of 30 representative samples. The configurations involve unencrypted model weights (PT) and encrypted model weights (CT) optimized for low latency (Latency) or high throughput (TP). For these configurations, the inference results were also compared with the inference results of running HE-Friendly AlexNet on PyTorch over the plaintext test-set by calculating the Root Mean Square Error (RMSE). These were always less than 4e−3.

TABLE 3

AlexNet executed in the present framework with different configurations.

| Configuration | Latency (sec.) | Amortized Latency (sec.) | Enc + Dec (sec.) | Memory (GB) |
|---|---|---|---|---|
| PT-Latency | 181.9 | 181.9 | 5.3 | 123.8 |
| PT-TP | 720.8 | 90.1 | 5.4 | 568.1 |
| CT-Latency | 358.1 | 358.1 | 5.4 | 223.4 |
| CT-TP | 1130.4 | 282.6 | 5.6 | 688.8 |

Optimizer Accuracy

The optimizer module 110 (see FIGS. 1A, 1B) and its simulator 110b estimate the time and memory usage for a given configuration option on a single CPU thread. For that, it relies on pre-benchmarked measures of the different FHE operations. To assess the accuracy of these estimations, the following experiment on HE-friendly AlexNet were performed using encrypted model. The four configuration options were selected which achieved the lowest estimated latency when using local search and compared the inference time and the encryption time of the input and the model between the simulation output and an actual run over encrypted data. Table 4 summarizes the results. It may be observed that the simulator provides relatively accurate time estimations for all four configurations. The average estimated time deviation is −15.8%, −11.9%, and −7.2% for inference, model encryption, and batch input encryption, respectively. It is noted that the simulated storage matches the measured storage for all configurations, thus this data is not included in Table 4.

TABLE 4

| Configuration | Inference (sec.) | Model encryption. (sec.) | Input encryption. (sec.) |
|---|---|---|---|
| Conf$_1$ | 4232 (−11%) | 1509 (−11.5%) | 162 (−6.8%) |
| Conf$_2$ | 4758 (−13.9%) | 1493 (−12.1%) | 164 (−7.9%) |
| Conf$_3$ | 4927 (−18.1%) | 1680 (−11.5%) | 177 (−6.8%) |
| Conf$_4$ | 4798 (−20%) | 1668 (−12.3%) | 178 (−7.3%) |

Simulated time estimations for the configurations (Conf$_i$)$_{i=1..4}$ formatted as [tile shape − convolution mode]: [16, 8, 8, 16, 1]-CWHFB, [8, 8, 8, 32, 1]-CWHFB, [16, 8, 8, 16, 1]-FWHCB, [32, 8, 8, 8, 1]-FWHCB, respectively. The acronyms CWHFB and FWHCB indicate the order of dimensions in the tile tensor. The deviation of the estimated times from the real times are reported in brackets.

Additional Comparisons

Tile tensors capture as a special case the simple method where each element of the input matrices is placed in a separate ciphertext. Table 2 reports the results for this method in the last row.

Two more special cases of matrix-vector multiplication algorithms are described in [Crockett 2020] (see, Eric Crockett. A low-depth homomorphic circuit for logistic regression model training. Cryptology ePrint Archive, Report 2020/1483, 2020.) These are equivalent to Eq(1) and Eq(2) above. In addition, [Crockett 2020] shows an extension to matrix-matrix multiplication by extracting columns from the second matrix and applying matrix-vector multiplication with each. This extraction of columns requires multiplication by mask and increases the multiplication depth. With the present tile tensors method, a natural extension to matrix-matrix multiplication may be obtained that doesn't require increasing the multiplication depth.

A different family of techniques are based on diagonalization. The basic method for matrix-vector multiplication is described in [Halevi 2014] (see, Shai Halevi and Victor Shoup. Algorithms in helib. In Juan A. Garay and Rosario Gennaro, editors, Advances in Cryptology—CRYPTO 2014-34th Annual Cryptology Conference, Santa Barbara, CA, USA, Aug. 17-21, 2014, Proceedings, Part I, volume 8616 of Lecture Notes in Computer Science, pages 554-571. Springer, 2014. doi:10.1007/978-3-662-44371-2_31.) For a ciphertext with n slots, an n×n matrix is pre-processed to form a new matrix, where each row is a diagonal of the original matrix. Then, multiplication with a vector can be done using n rotations, multiplications, and additions. The performance of the present depends on the tile shape. For example, for square tiles of a shape approximating $[\sqrt{n}, \sqrt{n}]$, the matrix-vector multiplication costs n multiplications and $\sqrt{n}\log\sqrt{n}$ rotations. (The matrix breaks down to n tiles in this case; each needs to be multiplied with one vector tile. The summation reduces the shape of the external tensor to $[\sqrt{n}, 1]$, and each of the remaining tiles is summed over using $\log\sqrt{n}$ rotation).

Some improvements to diagonalization techniques have been presented, which reduce the number of required rotations to $O(\sqrt{n})$ under some conditions, and by exploiting specific properties of the HE schemes of HElib [Halevi 2014]. The present methods make no special assumptions. Exploiting such properties and combining them with the tile tensor data structure is reserved for future work.

In [Ciaoqian 2018] (see, Xiaoqian Jiang, et al. Secure outsourced matrix computation and application to neural networks. In Proceedings of the 2018 ACM SIGSAC Conference on Computer and Communications Security, CCS '18, page 1209-1222, New York, NY, USA, 2018. Association for Computing Machinery.), a matrix-matrix multiplication method based on diagonalization is described. They reduce the number of rotations to $O(n)$ instead of $O(n_2)$ for multiplying with n vectors. However, this comes at the cost of increasing the multiplication depth by two multiplications with plaintexts. This is a significant disadvantage in non-client-aided FHE, since the performance of a circuit is generally quadratic in its depth, and from practical considerations the depth is sometimes bounded.

Convolution

A convolution layer is a basic building block in NN. Previous work presented optimizations for small input: GAZELLE (see, Chiraag Juvekar, et al. GAZELLE: A low latency framework for secure neural network inference. In 27th USENIX Security Symposium (USENIX Security 18), pages 1651-1669, Baltimore, MD, August 2018. USENIX Association.) considered a 28×28 grey scale images. GALA (see, Qiao Zhang, et al. Gala: Greedy computation for linear algebra in privacy-preserved neural networks. arXiv preprint arXiv:2105.01827, 2021.) considered 16×16 images. HEAR (see, Miran Kim, et al. HEAR: human action recognition via neural networks on homomorphically encrypted data. CoRR, abs/2104.09164, 2021.) considered 3D tensor input of size 32×15×2.

In contrast, the present inventors considered 224×224 RGB images. Using the methods of Gazelle, GALA, and/or HEAR for such large inputs is less efficient, because they pack $c_n$ channels of the input in a single ciphertext. Then, they act on all $c_n$ channels taking advantage of the SIMD feature. For example, GALA and GAZELLE require a total of $$O\left(\frac{f + cw_I h_I}{c_n}\right)$$

rotation and multiplication operations, where f, c, $w_f$, $h_f$ are defined above. In HEAR, a sequence of convolutions is considered. Then a pre-processing step between two convolution steps is needed. Computing the pre-processing step and the convolution takes $$O\left(w_F h_F \frac{w_I}{t_1} \frac{h_I}{t_2} \frac{c^2}{t_3} f\right)$$

rotation and multiplication operations. For images of size 244×244=50,176 at most one channel can fit in a ciphertext that has 65,536 slots, i.e. $c_n=1$. Using ciphertexts with fewer slots or bigger images results in performance degradation since the data of a single channel is spread among several ciphertexts. Previous work did not explain how to extend to support this case efficiently. Trivially, more slots can be emulated using several ciphertexts. This adds to the running time a factor proportional to the image size, i.e. $O(w_f h_f)$.

In the present convolution method, the number of rotations for larger images increases by a factor of $$O\left(w_F \frac{w_I}{t_1} + h_F \frac{h_I}{t_2} + w_F h_F\right)$$

and the number of multiplications by $$O\left(\frac{w_I}{t_1} \frac{h_I}{t_2}\right),$$

which is better than previous works for large images. For multiple channels, filters and samples in a batch, the present method run time increases by a factor of $$O\left(\frac{c}{t_3} \frac{b}{t_4} \frac{f}{t_5}\right),$$

and additional $$O\left(\frac{w_O}{t_1} \frac{h_O}{t_2} \frac{b}{t_4} \frac{f}{t_5} \log t_3\right)$$

rotations required for summing over channels inside the tile. By choosing values for the tile shape $t_i$, it may be optimized for the particular sizes of a given computation.

Sequence of Convolution Layers

In GAZELLE and GALA, optimizations were made for a single convolution layer. While this is important, deep networks have long sequences of convolution networks of different sizes and different numbers of filters. For example, AlexNet has five consecutive layers of convolution of different sizes.

To support more layers, previous works assumed a non FHE step, such as garbled circuits or another MPC protocol, after each layer (in a client-aided approach). The non-FHE step performs the activation function and puts the input for the next layer in the correct packing. Converting the packing using an FHE-only system is expensive. In HEAR, an all-FHE solution was considered. However, they required a pre-processing step that needs $O(w_f h_f cb)$ multiplications and $$O\left(w_I h_I c b \frac{t_1 t_2 - 1}{t_2 t_2}\right)$$

rotations.

In contrast, the present packing method requires a pre-processing step before even layers only. In that case, it requires $$O\left(\frac{w_I}{t_1} \frac{h_I}{t_2} \frac{c}{t_3} \frac{b}{t_4} \log t_5\right)$$

rotations; here, $w_I$, $h_I$, c and b refer to the image dimensions, the number of channels and the batch size in the input to the layer.

Neural Network Inference

The present approach is comrade with other end-to-end neural network inference solutions, e.g., nGraph-HE2 (see, Fabian Boemer, et al. NGraph-HE2: A High-Throughput Framework for Neural Network Inference on Encrypted Data. In Proceedings of the $7^{th}$ ACM Workshop on Encrypted Computing & Applied Homomorphic Cryptography, WAHC'19, pages 45-56, New York, NY, USA, 2019. Association for Computing Machinery.) and TenSEAL (see, Ayoub Benaissa, et al. TenSEAL: A Library for Encrypted Tensor Operations Using Homomorphic Encryption. arXiv, 2021.)

Table 5 reports the comparison results. TenSEAL uses diagonalization techniques for matrix-multiplication and im2col for convolution, assuming a single image as input. Moreover, TenSEAL assume unencrypted model weights. Hence, TenSEAL was comrade to the present framework when optimized for batch size of one, for unencrypted model weights (PT) and for completeness also show results for encrypted model weights (CT). nGraph-HE2 also focuses on unencrypted models. It uses SIMD packing, which is a special case of the present framework when optimized for the largest possible batch size.

TABLE 5

Comparison of the CryptoNets benchmark with the present tile tensor framework and other NN compilers that are freely available online.

| Framework | Latency (sec.) | Amortized Latency (sec.) |
| --- | --- | --- |
| TenSeal (b = 1) | 3.55 | 3.55 |
| Present Method-PT (b = 1) | 0.48 | 0.48 |
| Present Method-CT (b = 1) | 0.56 | 0.56 |
| nGraph-HE2 (b = 8192) | 11.93 | 0.00146 |
| Present Method-TP (b = 8192) | 13.52 | 0.00165 |
| Present Method-CT (b = 8192) | 41.32 | 0.00504 | b = 1 and b = 8192 were set for the top and bottom lines, respectively.

The results highlight the efficiency and versatility of the present framework. Targeting optimal latency, the present framework provides at least seven times speed-up over nGraph-HE2 and TenSEAL. Moreover, it can adapt to variable batch sizes. When targeting optimal throughput, nGraph-HE2 was slightly faster than the present framework. This can be explained by the fact that the present library currently focuses on optimizing the packing scheme, which in this case are identical to the one used by nGraph-HE2. Hence, the two libraries perform the exact same set of homomorphic operations, but nGraph-HE2 also provides optimizations for pipelining the underlying FHE instructions (e.g., by lazy rescaling). It may be stressed that the power of using different packing schemes is more noticeable for large networks that involve a sequence of operations and is often not reflected in small networks such as CryptoNets.

An additional framework that is not included in the above comparison experiments is the CHET compiler (see, Roshan Dathathri, et al. Chet: An optimizing compiler for fully-homomorphic neural-network inferencing. In Proceedings of the 40th ACM SIGPLAN Conference on Programming Language Design and Implementation, PLDI 2019, page 142-156, New York, NY, USA, 2019. Association for Computing Machinery.), which performs inference of encrypted data in a non-encrypted network. They report 2.5 seconds latency on a similarly sized, though less accurate, MNIST neural network classifier using 16 threads. They use a similar approach of an abstract data structure, CipherTensor, combined with automatic optimizations. The present believe CipherTensors are less flexible than tile tensors. They include a small fixed set of implemented layouts, each with its own kernel of algorithms, whereas tile tensors offer a wider variety of options with a single set of generalized algorithms. Further, it wasn't demonstrated that CipherTensors offer an easy method to trade latency for throughput and control memory consumption, as is possible in tile tensors by controlling the batch dimension. Finally, CipherTensors require replication of the input data using rotations, whereas some of these replications can be avoided using tile tensors.

The EVA compiler (see, Roshan Dathathri, et al. Eva: An encrypted vector arithmetic language and compiler for efficient homomorphic computation. In Proceedings of the 41st ACM SIGPLAN Conference on Programming Language Design and Implementation, PLDI 2020, page 546-561, New York, NY, USA, 2020. Association for Computing Machinery.) is built on top of CHET. They report an improved performance of 0.6 seconds on the same network using 56 threads and various optimizations unrelated to packing; these optimizations are outside the scope of this paper. The present best result of 0.48 seconds was achieved for the more accurate CryptoNets architecture. The present inventors believe even better results can be obtained by combining the present packing optimizations with EVA's optimizations (e.g., eliminating rescale operations to reduce the overall prime chain length).

The LoLa network (see, Alon Brutzkus, et al. Low latency privacy preserving inference. In Kamalika Chaudhuri and Ruslan Salakhutdinov, editors, Proceedings of the 36th International Conference on Machine Learning, volume 97 of Proceedings of Machine Learning Research, pages 812-821, Long Beach, California, USA, 09-15 Jun. 2019. PMLR.) also reports results for the CryptoNets architecture. They achieve a latency of 2.2 seconds using 8 threads. The LoLa network uses 150 ciphertext-ciphertext multiplications, 279 rotations, and 399 additions for a single prediction. (the present deduced these numbers from LoLa's detailed description.) The present approach requires 32 multiplications, 89 rotations, and 113 additions. These differences roughly explain the observed latency results.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:
   at least one hardware processor; and
   a non-transitory computer-readable storage medium having stored thereon program instructions, the program instructions executable by the at least one hardware processor to:
   receive an input tensor, wherein said input tensor has a shape defined by $[n_1, \ldots, n_k]$, where k is equal to a number of dimensions that characterize the input tensor,
   receive tile tensor metadata comprising at least: (i) a tile tensor shape defined by $[t_1, \ldots, t_k]$, and (ii) information indicative of an interleaving stride to be applied with respect to each dimension of said tile tensor, and
   construct an output tensor comprising a plurality of said tile tensors, by applying a packing algorithm which maps each element of said input tensor to at least one slot location of one of said plurality of tile tensors, based, at least in part, on said tile tensor shape and said interleaving stride,
   wherein said interleaving stride results in non-contiguous mapping of said elements of said input tensor, such that each of said tile tensors includes a subset of said elements of said input tensor which are spaced within said input tensor according to said interleaving stride.

2. The system of claim 1, wherein said program instructions are further executable to store said output tensor and said tile tensor metadata.

3. The system of claim 1, wherein said program instructions are further executable to unpack said input tensor from said stored output tensor, based on said tile tensor metadata.

4. The system of claim 1, wherein said tile tensor metadata further comprises a replication parameter, and wherein said packing algorithm is configured to perform, based on said replication parameters, replication of said elements of said input tensor, such that each of said elements of said input tensor is mapped to multiple slot locations along a dimension of one of said tile tensors.

5. The system of claim 1, wherein said program instructions are further executable to:
   receive a filter associated with a convolution computation over said input tensor;
   compute said convolution by applying a multiplying operator which multiplies said filter element-wise over each of said tile tensors in said output tensor;
   apply a summation algorithm that sums over the results of said multiplying; and
   output a result of said applying of said summation algorithm as a result of said convolution.

6. The system of claim 5, wherein said convolution is part of a neural network inference.

7. The system of claim 1, wherein said tensor tiles are homomorphic encryption ciphertexts.

8. A computer-implemented method comprising:
   receiving an input tensor, wherein said input tensor has a shape defined by $[n_1, \ldots, n_k]$, where k is equal to a number of dimensions that characterize the input tensor;
   receiving tile tensor metadata comprising at least: (i) a tile tensor shape defined by $[t_1, \ldots, t_k]$, and (ii) information indicative of an interleaving stride to be applied with respect to each dimension of said tile tensor;
   constructing an output tensor comprising a plurality of said tile tensors, by applying a packing algorithm which maps each element of said input tensor to at least one slot location of one of said plurality of tile tensors, based, at least in part, on said tile tensor shape and said interleaving stride,
   wherein said interleaving stride results in non-contiguous mapping of said elements of said input tensor, such that each of said tile tensors includes a subset of said elements of said input tensor which are spaced within said input tensor according to said interleaving stride.

9. The computer-implemented method of claim 8, further comprising storing said output tensor and said tile tensor metadata.

10. The computer-implemented method of claim 8, further comprising unpacking said input tensor from said stored output tensor, based on said tile tensor metadata.

11. The computer-implemented method of claim 8, wherein said tile tensor metadata further comprises a replication parameter, and wherein said packing algorithm is configured to perform, based on said replication parameters, replication of said elements of said input tensor, such that each of said elements of said input tensor is mapped to multiple slot locations along a dimension of one of said tile tensors.

12. The computer-implemented method of claim 8, further comprising:
    receiving a filter associated with a convolution computation over said input tensor;
    computing said convolution by applying a multiplying operator which multiplies said filter element-wise over each of said tile tensors in said output tensor;
    applying a summation algorithm that sums over the results of said multiplying; and
    outputting a result of said applying of said summation algorithm as a result of said convolution.

13. The computer-implemented method of claim 12, wherein said convolution is part of a neural network inference.

14. The computer-implemented method of claim 8, wherein said tensor tiles are homomorphic encryption ciphertexts.

15. A computer program product comprising a non-transitory computer-readable storage medium having program instructions embodied therewith, the program instructions executable by at least one hardware processor to:

receive an input tensor, wherein said input tensor has a shape defined by $[n_1, \ldots, n_k]$, where k is equal to a number of dimensions that characterize the input tensor;

receive tile tensor metadata comprising at least: (i) a tile tensor shape defined by $[t_1, \ldots, t_k]$, and (ii) information indicative of an interleaving stride to be applied with respect to each dimension of said tile tensor; and construct an output tensor comprising a plurality of said tile tensors, by applying a packing algorithm which maps each element of said input tensor to at least one slot location of one of said plurality of tile tensors, based, at least in part, on said tile tensor shape and said interleaving stride, wherein said interleaving stride results in non-contiguous mapping of said elements of said input tensor, such that each of said tile tensors includes a subset of said elements of said input tensor which are spaced within said input tensor according to said interleaving stride.

16. The computer program product of claim 15, wherein said program instructions are further executable to store said output tensor and said tile tensor metadata.

17. The computer program product of claim 15, wherein said program instructions are further executable to unpack said input tensor from said stored output tensor, based on said tile tensor metadata.

18. The computer program product of claim 15, wherein said tile tensor metadata further comprises a replication parameter, and wherein said packing algorithm is configured to perform, based on said replication parameters, replication of said elements of said input tensor, such that each of said elements of said input tensor is mapped to multiple slot locations along a dimension of one of said tile tensors.

19. The computer program product of claim 15, wherein said program instructions are further executable to:

receive a filter associated with a convolution computation over said input tensor;

compute said convolution by applying a multiplying operator which multiplies said filter element-wise over each of said tile tensors in said output tensor;

apply a summation algorithm that sums over the results of said multiplying; and output a result of said applying of said summation algorithm as a result of said convolution.

20. The computer program product of claim 19, wherein said convolution is part of a neural network inference.

* * * * *